United States Patent
Kartha et al.

(10) Patent No.: US 10,019,538 B2
(45) Date of Patent: Jul. 10, 2018

(54) KNOWLEDGE REPRESENTATION ON ACTION GRAPH DATABASE

(71) Applicant: TATA CONSULTANCY SERVICES LIMITED, Mumbai (IN)

(72) Inventors: Rajesh Kartha, Kochi (IN); Supriya V, Kochi (IN); Viju Chacko, Kochi (IN); Shampa Sarkar, Kochi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 414 days.

(21) Appl. No.: 14/869,137

(22) Filed: Sep. 29, 2015

(65) Prior Publication Data
US 2016/0292304 A1     Oct. 6, 2016

(30) Foreign Application Priority Data

Apr. 1, 2015   (IN) .......................... 1405/MUM/2015

(51) Int. Cl.
*G06F 17/00*   (2006.01)
*G06F 17/30*   (2006.01)
*G06N 5/02*    (2006.01)
*G06F 17/27*   (2006.01)

(52) U.S. Cl.
CPC .... *G06F 17/30958* (2013.01); *G06F 17/2785* (2013.01); *G06F 17/30734* (2013.01); *G06N 5/027* (2013.01)

(58) Field of Classification Search
CPC ........... G06F 17/30958; G06F 17/2785; G06F 17/30734
See application file for complete search history.

(56) References Cited

U.S. PATENT DOCUMENTS

| | | | |
|---|---|---|---|
| 7,424,701 B2* | 9/2008 | Kendall | G06N 5/027 706/46 |
| 2010/0121630 A1 | 5/2010 | Mende et al. | |
| 2012/0179642 A1* | 7/2012 | Sweeney | G06F 17/2785 706/55 |

FOREIGN PATENT DOCUMENTS

WO     2007008347     1/2007

OTHER PUBLICATIONS

"The Framework for Communication Activities", HypergraphDB, can be found at http://hypergraphdb.org/learn?page=CommunicationImplementation&project=hypergraphdb, 2016, 7 pages.

* cited by examiner

*Primary Examiner* — Cheryl Lewis
(74) *Attorney, Agent, or Firm* — Hamre, Schumann, Mueller & Larson, P.C.

(57) ABSTRACT

Knowledge representation in multi-layered database includes systems and methods for storing and retrieving data in the multi-layered database. In the multi-layered database, an action graph database includes participant-entity nodes corresponding to real world entities and action nodes corresponding to action capabilities of the real world entities. Each of the participant-entity nodes and the action nodes is associated with properties, relationships, and relationship properties. Underlying the action graph layer is a standard graph layer that stores nodes, node properties associated with the nodes, edges, and edge properties associated with the edges, wherein the nodes correspond to the participant-entity nodes and the action nodes. Further, underlying the standard graph layer is a backend database layer that stores corresponding data and metadata.

18 Claims, 22 Drawing Sheets

KNOWLEDGE REPRESENTATION ON ACTION GRAPH DATABASE

TECHNICAL FIELD

The present subject matter relates, in general, to systems and methods for knowledge representation, and in particular to a system and method for storage and retrieval of capability information within multi-layered database.

BACKGROUND

Knowledge is defined as the information about a domain that can be stored, queried and used to solve problems in that domain. Knowledge can be represented by a representation scheme to form an Artificial Intelligence (AI) system. In other words, the representation scheme may be understood as the manner in which the knowledge is handled to solve problems in that particular domain. Several organizations are involved in modeling knowledge representation techniques in AI for different technology domains. For example, knowledge representation may be used in healthcare management, hospitality, transport, integrated circuit design, computer architecture design, social network systems, and the like, to facilitate digitized solutions to cater industry specific business need. Thus, such knowledge representation techniques can be considered as core component of knowledge management for an enterprise.

Nowadays, some of these knowledge representation techniques are modeled using graph databases due to their capability of storing an enormous volume of dynamic and sparse datasets, and further due to their capability of facilitating retrieval of complex query with less computational cost by the virtue of graph traversals. Generally, the graph databases are modeled using graph structures to represent and store datasets. The graph structures conveniently encode diverse relations for information retrieval, by virtue of its inherent connectedness. The graph structures include nodes and edges. The nodes represent entities and the edges represent relationships among the entities. Further, the graph structures can be traversed, partitioned, colored, and clustered, based on the real-world use case scenarios and solutions for efficient knowledge representation and knowledge management.

Each node and edge can have several properties associated therewith for storing attributes of the node and edge, respectively. These properties can further be attached to each node and edge as key-value pairs. These properties facilitate in information retrieval from the graph database by means of (indexed) search based on these stored properties. Further, information retrieval can also be performed by means of graph traversal.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
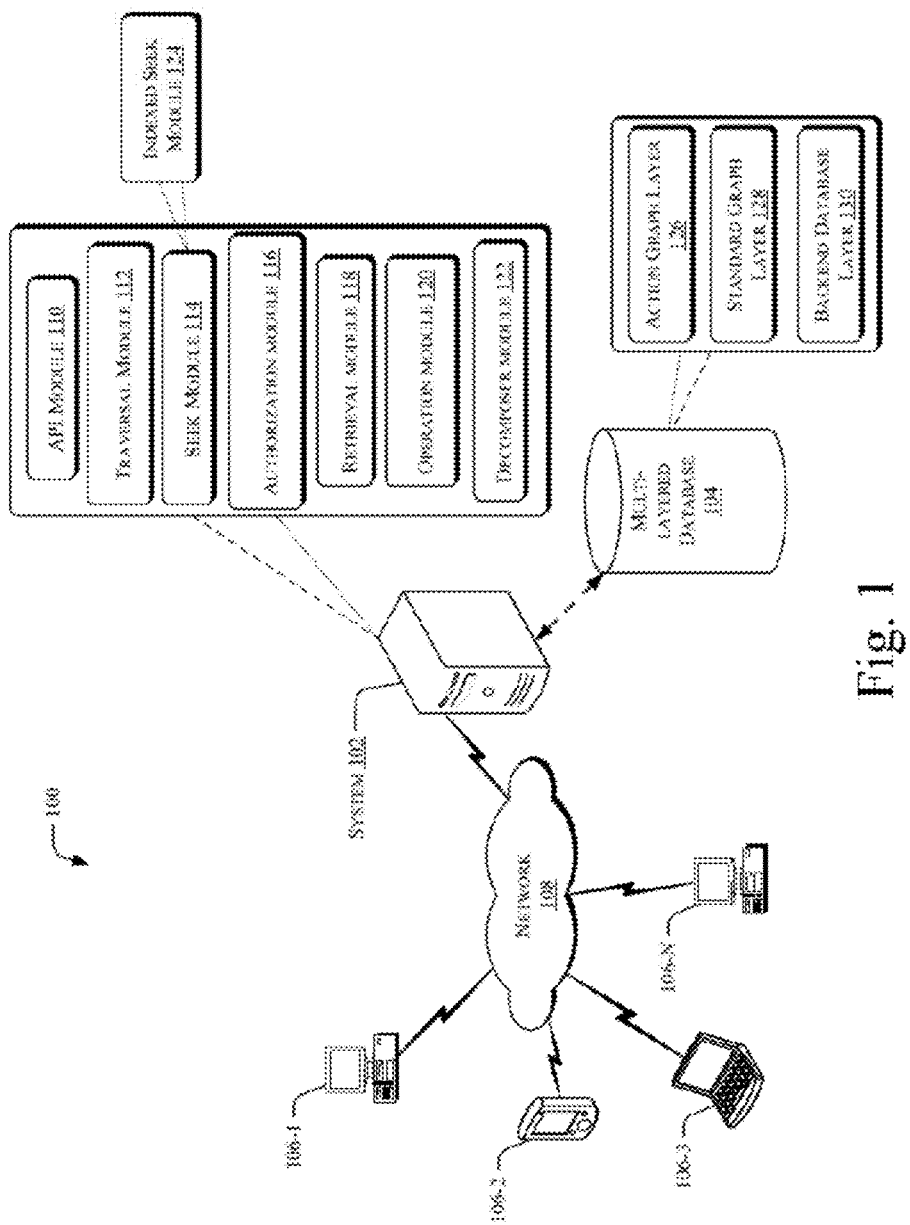
FIG. 1 illustrates a computing environment implementing a system for knowledge representation in a multi-layered database, in accordance with an implementation of the present subject matter.

Typically, knowledge representation deals with a large size/amount of data to be stored, retrieved, and analyzed. This large amount of data may include data, metadata, and relationships between the data, along with rules and applicability of the data, the metadata and the relationships. Managing and processing of such large amounts of data can be challenging because the large amount of data causes a high I/O latency. For reducing the I/O latency, several modeling techniques, such as rule based knowledge representation and frame knowledge representation have been employed. Knowledge representations modeled by such modeling techniques encounter scalability challenges while storing or retrieving a large amount of data and involve intense computations which lead to non-linear performance scaling when associated databases are scaled. In some other techniques, a graphical representation may be employed for knowledge representation. The graphical representation includes nodes and edges to represent entities and relationships between the entities. The graphical representation may be employed using properties of nodes and edges, for storing or retrieving information. Retrieval of information from databases modeled using such techniques consumes time and is slow. For retrieving the information, a query is executed. For query execution, generally, various nodes of the graphical representation have to be traversed to retrieve related information, which is a time consuming process.

Further, in today's world, the amount of data managed by databases increases tremendously in volume with time, with additional challenges brought in by varieties of data and velocity with which the data flows/changes. With the big data technologies, storing large volume of data which can further be unstructured or semi-structured in nature and which has real-time to near real-time data flow becomes possible. But querying and retrieving information poses a challenge, as these datasets are enormously sparse and traversing such sparse dataset, for every query retrieval, is cost effective. Towards this direction, graph database based knowledge representation have been developed, which can manage sparse data and wherein complex queries can be retrieved by graph traversal. In the knowledge representation using the graph databases, every node/edge has properties associated with it as key-value (k, v) pairs. The properties associated with the nodes/edges are further indexed for facilitating seek and query retrieval. While, the graph is a flexible and expandable schema for storage, the index for the properties would have to be maintained in a manner optimal for query retrieval, thus loosing the flexibility and expandability/scalability of the schema.

Furthermore, the knowledge representation using the graph databases is primarily focused on representing the nodes as real world entities and the edges as relationships among the real world entities, while action capabilities of the real world entities have been barely captured by such knowledge representation using the graph databases. That is, the edges of the graph database capture only the relation by which two connecting nodes are related, in a fixed schema.

Systems and methods of the present subject matter allow capturing action capabilities of real world-entities within knowledge representation in an efficient, flexible, and extensible manner using an action graph layer orchestrated on top of a standard graph layer. As used herein, knowledge representation may include storing, retrieving, and manipulation of information. The knowledge representation as per the present subject matter can be implemented, for example, to store data related to a firm, such as employee data including name, date of birth, salary, designation, operations, and projects data along with the capabilities of an employee or the capabilities of an operation or a project or how to perform a project or orchestrate an enterprise process or similarity (like) or comparison between a plurality of employees' capabilities, operation, project or process orchestration, and the like. In other examples, the knowledge representation may be implemented for various sectors, such as manufacturing, healthcare management, hospitality, transport, integrated circuit design, computer architecture design, a social network system, and the like. In yet another implementation, the knowledge representation may include data related to multiple different entities and domains, such as data obtained from the Internet or from the Internet of things (IoT). Accordingly, the information within the knowledge representation may be interrelated such as, information of employees of an organization, information related to a hospital, information related to transportation, and the like, or may be independent to each other, for example, information related to various different domains.

In accordance with the present subject matter, the knowledge representation is implemented using a multi-layered database. In an implementation, the multi-layered database may be a three layered database, which includes an action graph layer, a standard graph layer, and a backend database layer. For storing data in the multi-layered database, the data may be represented as nodes in the action graph layer or the standard graph layer, and decomposed in multiple stages into the data and metadata stored in the backend database layer.

The action graph layer can include the real world entities represented as 'participant-entity nodes' and the action capabilities of the real world entities represented as 'action nodes'. As can be appreciated by those skilled in the art, the action capabilities of the real world entities are not virtual, but real-world actions by themselves, and hence the systems of the present subject matter are configured to represent the capabilities of the real world entities as distinct nodes referred to as the action nodes, and not as relationships between the real world entities. Further, one action capability (or action node) of participant-entity (participant-entity node) can be inherited from the action capability (action node) of the same or different participant entity (participant-entity node), the action capabilities (action node) can have constituent synonyms (constituent action node), action capabilities (action node) can be represented with encoded context of its participant entities (participant-entity node), the action capability (properties of action node) can be parameterized, action capability (action node) can facilitate many-participant-entity nodes to an action node to many-participant-entity nodes connection for many-to-many graph traversal, action node can be connected/related to another action node by 'like' relationship comprising concept to real factorization, and the like, which is not feasible in the conventional graph databases, where a fixed relation at a fixed edge connects two participant-entities.

The real world entities may be understood as the entities that exist in real world. In an example, the real world entities may be in the form of names of the person, such as John, Peter, Michael, and the like. In another example, real world entities may be designations of employees, such as manager, associate, senior manager, producer, and the like. In one more example, the real world entities may be any real world objects, such as houses, refrigerators, laptops, books, and the like. These examples of real world entities are non-limiting examples provided for illustration. It will be appreciated that the real world entities can include any entity existing in the real world. Each of the real world entities are represented by participant-entity nodes and may be associated with their respective attributes. The attributes include node properties, the relationships of the corresponding participant-entity node and the relationship properties. In an example and not by way of limitation, a participant-entity node may be connected/related to another participant-entity node by relationship including but not limiting to an inheritance relationship, a constituent relationship and a general relationship.

Further, the action capabilities of the real world entities may be understood as the capabilities that exist in real world and are represented by action nodes. In an example, the action capabilities or action nodes of the real world entities may be in the form of a verb that in syntax conveys an action as, for example, read, write, run, walk, learn, study; an occurrence as, for example, become, finish, or arrive; or a state of the real world entities as, for example, be, exist, or stand. Verb has tenses: present, to indicate that an action is being carried out; past, to indicate that an action has been done; future, to indicate that an action will be done. Verb may also agree with the real world entities or number of some of its arguments, such as its subject or object. In one more example, the action capabilities or action nodes can include, but not limited to, transitive verbs, intransitive verbs, linking verbs, to be verbs, and the like. In one of the embodiments, an adverb may be implemented as a modifier to the verb or corresponding action node.

Each of the action capabilities or action nodes of the real world entities may be associated with their respective attributes. The attributes include properties of the action nodes representing the action capabilities of the real world entities, the relationships among the action nodes and the corresponding relationship properties. In one example, the properties of the action nodes may enable the system to capture the context of the action node based on the related participant-entity nodes, identify the super-step and sub-steps associated with the corresponding actin node, quantize the capability information and further associate a pre-condition for the given action capability and the like. Further, the relationships connecting one action node to another action node can include, but not limited to, inheritance relationship, step relationship, constituent (synonym) relationship, and like relationship. For the sake of brevity, action capabilities and capabilities may be referred interchangeably in the description hereinafter.

Further, a participant-entity node may be connected to an action node by an action-participant relationship, which may include a modal relationship, or a general relationship. In one of the embodiments, the modal relationship may be connecting the action node with the corresponding participant entity node (viz. subject node) whereas the general relationship may be a general association, which connects a plurality of participants-entity nodes (viz. object nodes and the primitive literal nodes) with one action node.

Further, the data present in the action graph layer has one-to-one mapping to the underlying layers, i.e., the standard graph layer and the backend database layer, as decomposed data. As the standard graph layer is connected to backend database layer by a pluggable indexing architecture for the purpose of seeking and retrieving the data from the backend database layer, the underlying layers by themselves have fixed scalability and are thus computationally cost effective for data manipulation (creation, read, updation, deletion, etc.). The action graph layer lifts the fixation and provides an intuitive and scalable way of knowledge representation and manipulation in the form of creation, storage, retrieval, updation, deletion, modification, traversal, and the like.

The standard graph layer is created based on the action graph layer and is underlying the action graph layer. The standard graph layer includes nodes and edges, wherein an edge may connect two related nodes. Each of the nodes and edges are associated with their respective properties as key-value (k, v) pairs. The nodes, the edges, and node properties and edge properties are created by decomposing the participant-entity nodes, the action nodes and relationships between two action nodes, between two participant-entity nodes and between an action node and a participant-entity node of the action graph layer into the standard graph layer. In the standard graph layer, the properties associated with the nodes indicate the properties of at least the real world entities and their capabilities thereof, and the properties associated with the edges indicate the properties of the relationships among the real world entities and/or the capabilities of the real world entities, as depicted in the action graph layer. The standard graph layer is connected to a pluggable indexing architecture, for seeking and retrieving the required data from the backend database, which gives the standard layer a fixed schema and is scalable due to the presence of the action graph layer. The action graph layer facilitates adding new real world entities and new capabilities of the real world entities by a user via Application Programming Interfaces (APIs), without affecting other nodes and edges of the standard graph layer. Further the action graph layer can be exposed to the standard graph layer by another Application Programming Interface (API). In one of the implementation, such API may further be Blueprint (Industry standard) compatible, which allows the standard graph layer to have a pluggable architecture.

The backend database layer is created in a manner to hold a large volume of data which may further be dynamic and sparse in nature. The backend database layer includes data and metadata corresponding to the nodes, the edges, and the properties associated with the nodes and the edges of the standard graph layer, and thus the action graph layer. In one implementation, the backend database layer can be a columnar database storing a large volume of data in the order of at least terabyte. The data can further be sparse in nature. The backend database layer can further manipulate data in real-time. In another implementation, the backend database layer can store and manipulate a large sized data, such as data in terabyte, petabyte, and the like. In one implementation, the backend database layer include storage mechanisms, such as HBase or Cassandra, for Big Bata operations vis-a-vis File for small scale data operations, based on the Enterprise requirements or user configurations. Hence, the multi-layered database can be considered as pluggable storage service architecture with adaptability to toggle between different storage mechanisms.

Further, the pluggable index service architecture between the standard graph layer and the backend database layer is implemented for the purpose of indexed seek and retrieval of the data, which is described below in detail. The indexing architecture is further capable of indexing and facilitating seek/retrieval from a large volume of data of the order or terabyte or petabyte or higher. In one of the embodiments, such indexing architecture may allow an Industry standard Lucene indexing architecture or a customized Lucene indexing architecture.

In an implementation, for storing the data in the multi-layered database using the knowledge representation described herein, the real world entity, capability of the real world entity and their associated attributes may be received for storage in the multi-layered database, wherein the attributes characterize properties, relationships of the real world entity (participant-entity nodes) and the action capability (action nodes) and the corresponding relationship properties. Upon receipt of the attributes of the real world entity and their capability information, a participant-entity node corresponding to the real world entity may be stored in an action graph layer of the multi-layered database, wherein, based on the attributes of the real world entity, the participant-entity node is associated with participant properties that characterize the participant-entity node, and participant relationship that relates the participant-entity node to at least one other participant-entity node and the participant relationship properties that characterize the participant relationship. Further, along with the participant-entity node, an action node corresponding to the capability of the real world entity may be stored in the action graph layer of the multi-layered database, wherein, based on the attributes of capability of the real world entity, the action node is associated with action properties that characterize the action node, action relationships that relate the action node to at least one other action node, action relationship properties that characterize the action relationship, action-participant relationships that relate the action node to the participant-entity node and the action-participant relationship properties that characterize the action-participant relationship. The participant-entity node, the participant properties, the action node, and the action properties may be then decomposed into nodes and properties associated with the nodes. Further, the participant-relationship, the action-relationship, the action-participant relationship and the corresponding relationship properties of the relationships in the action graph layer may be decomposed into edges connecting the nodes and edge properties associated with the corresponding edges respectively. The node, the edges, the node properties, and the edge properties may be stored in the multi-layered database, and further decomposed into the data and metadata associated with the data. The data and the metadata may be then stored in a backend database layer of the multi-layered database.

In an implementation, for retrieval of the data from the multi-layered database, a query may be provided by a user and executed in the multi-layered database. In an example, the query may include at least a participant-entity node corresponding to a real world entity and an action node corresponding to a capability of the real world entity. Further, the user may refer to a person who seeks the capability information to be retrieved from the multi-layered database. For retrieving the capability information, the query is received from the user to identify a traversing logic to traverse the action graph layer based on the query. In an example, the traversing logic corresponds to the one or more participant-entity nodes associated with participant properties and the action nodes associated with action properties, and wherein a participant relationship relates the participant entity node to the at least one other participant-entity node, the participant properties characterize a participant-entity node, and wherein an action relationship relates the action node to the at least one other action node, an action relationship properties that characterize the action relationship, action-participant relationship that relates the action node to the at least one participant-entity node, and action-participant relationship properties that characterize the action-participant relationship, and wherein the action properties characterize an action node, further comprising at least one of the pre-condition parameter, the step parameter and the quantity parameter. Based on the participant-entity node, the action node, and the traversing logic, the capability information associated with the query is searched in the action graph layer of the multi-layered database. After searching the capability information, access privilege for the user is determined. The access privilege may be understood as rights to a user to access the nodes. In other words, access privilege defines whether the user has rights to access the nodes or not. When the user is privileged to access the capability information, the capability information is retrieved from the standard graph layer to the backend database layer by indexed seek and retrieval, for providing the capability information to the user.

Thus, the present subject matter provides for scalable and flexible multi-layered database. The methods and systems of present subject matter are further described in conjunction with the following figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and embodiments of the present subject matter, as well as specific examples thereof, are intended to encompass equivalents thereof.

FIG. 1 illustrates a computing environment 100 implementing a system 102 for knowledge representation in a multi-layered database 104, in accordance with an implementation of the present subject matter. The system 102 can be implemented to store a large amount of data in the multi-layered database 104, such that the large amount of data, for example, real world entities are represented as participant entity nodes, and the capabilities of real world entities are represented as action nodes, in order to facilitate retrieval of capability information regarding the real world entities by a user. The system 102 can be implemented in a computing device, such as a server, a desktop, a laptop, a personal digital assistant, a smart phone, or the like. The system 102 can further be hosted over a cloud or a fog as an IAAS (infrastructure as a service).

The system 102 may be coupled to one or more computing devices 106-1, 106-2, . . . , 106-N via a network 108. The computing devices 106-1, 106-2, . . . , 106-N may hereinafter be collectively referred to as computing devices 106, and individually referred to as a computing device 106. The computing devices 106 may include, but are not restricted to, servers, desktops, laptops, personal digital assistants, smart phones, and the like. The network 108 may be a wireless network, wired network, or a combination thereof.

The network 108 can be implemented as any of different types of networks, such as intranet, local area network (LAN), wide area network (WAN), the internet, and their combination. The network 108 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

Further, the system 102 can communicate with the multi-layered database 104, either directly or over the network 108. The multi-layered database 104 can be a single database or multiple databases, which may either be co-located or distributed. Further, the multi-layered database 104 can include multiple layers of databases. Each of the layers of databases can be understood as a single database or multiple databases, which may be either co-located or distributed. In one example, the multi-layered database 104 can include three layers, i.e., an action graph layer 126, a standard graph layer 128, and a backend database layer 130. In one example, the backend database layer 130 can provide for scalable data storage through one or more of HDFS, HBASE, RDBMS, or other types of databases and file systems. In one of the embodiments, one or more layers of the multi-layered database 104 may further be hosted over Cloud. In one example, the backend database layer 130 includes both data and metadata. The backend database layer 130 can be designed to scale for large volumes of data, for example, using various big data techniques based on Apache Hadoop ecosystem for content data storage and data mining. Accordingly, the backend database layer 130 can also store large volumes of data spread across clusters of servers. In other examples, small scale data and metadata can be stored in traditional relational databases or local file systems.

In an implementation, the system 102 can include an Application Programming Interface (API) module 110, a traversal module 112, a seek module 114, an authorization module 116, a retrieval module 118, an operation module 120, and a decomposer module 122 for storing, retrieving, and manipulation of data stored in the multi-layered database 104. In one example, the seek module 114 may comprise an indexed seek module 124 for performing indexing of the data stored in the multi-layered database 104 for easy and fast retrieval of the data.

The working or operation of the system 102, for storing, retrieving, and manipulation of the information stored in the multi-layered database 104, is described in detail with reference to FIG. 2 in the description hereinafter.

Figure 2:
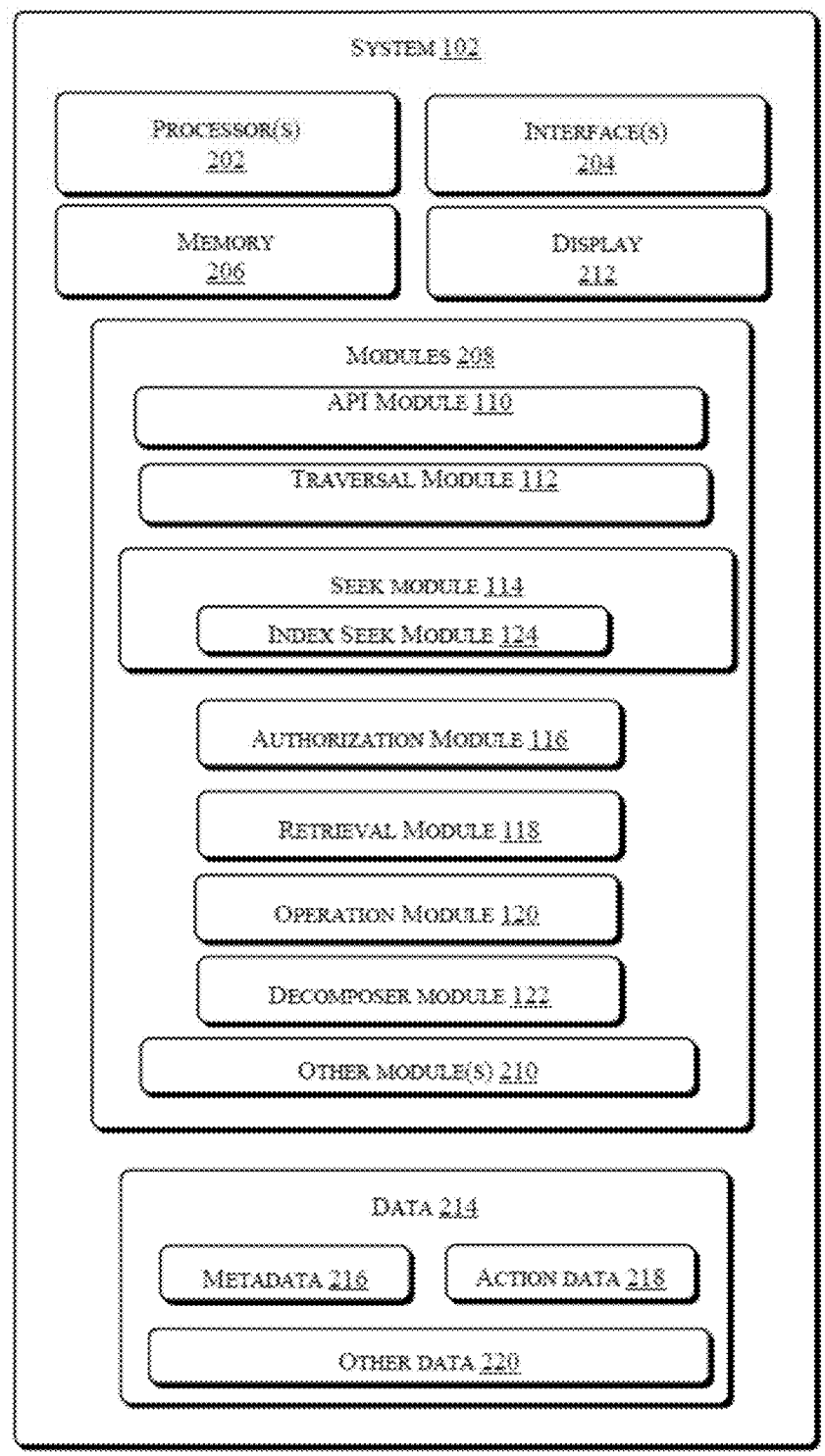
FIG. 2 illustrates a system for knowledge representation in a multi-layered database in detail, in accordance with an implementation of the present subject matter.

FIG. 2 illustrates exemplary components of the system 102 in accordance with an embodiment of the present subject matter. In an implementation, the system 102 includes processor(s) 202. The processor(s) 202 may be implemented as microprocessors, microcomputers, microcontrollers, digital signal processors, central processing units, state machines, logic circuitries, and/or any devices that manipulate signals based on operational instructions. Among other capabilities, the processor(s) 802 fetch and execute computer-readable instructions stored in a memory or non-transitory computer readable medium.

The functions of the various elements shown in FIG. 2, including any functional blocks labeled as "processor(s)", may be provided through the use of dedicated hardware as well as hardware capable of executing non-transitory machine readable instructions. Moreover, the term processor may implicitly include, without limitation, digital signal processor (DSP) hardware, network processor, application specific integrated circuit (ASIC), field programmable gate array (FPGA), read only memory (ROM) for storing non-transitory machine readable instructions, random access memory (RAM), and non-volatile storage. Other hardware, conventional and/or custom, may also be included.

The system 102 also includes interface(s) 204. The interface(s) 204 may include a variety of machine readable instruction-based and hardware-based interfaces that allow the system 102 to interact with other devices, including web servers, data sources, and external repositories, for the purpose of generation of digital signatures and digitally signed documents. Further, the interface(s) 204 may enable the system 102 to communicate with other communication devices, such as network entities, over a communication network.

Further, the system 102 includes memory 206, coupled to the processor(s) 202. The memory 206 may include any computer-readable medium, for example, volatile memory (e.g., RAM), and/or non-volatile memory (e.g., EPROM, flash memory, etc.).

In one implementation, the system 102 can include a display 212 or can be coupled to a display 212. In other implementations, the display 212 can be coupled to or a part of one or more of the user devices 104. Accordingly, in such implementations, the system 102 can generate a GUI and provide to a user device 104 for displaying over the display 212.

Further, the memory 206 can include or be coupled to module(s) 208 and data 214. The module(s) 208 may be coupled to the processor(s) 202. The module(s) 208, amongst other things, includes routines, programs, objects, components, data structures, and the like, which perform particular tasks or implement particular abstract data types. In one implementation, the module(s) 208 can include the API module 110, the traversal module 112, the seek module 114, the authorization module 116, the retrieval module 118, the operation module 120, the decomposer module 122, and other modules 210. In an example, the seek module 114 can include the indexed seek module 124. The other module(s) 210 further include modules that supplement applications on the system 102, for example, modules of an operating system.

The data 214 serves, amongst other things, as a repository for storing data that may be fetched, processed, received, or generated by the module(s) 208. In one implementation, the data 214 can include metadata 216, action data 218, and other data 220. The other data 220 can correspond to data generated or used by other modules 210. Although the data 214 is shown internal to the system 102, it may be understood that the data 214 can reside in an external repository (not shown in the figures), which may be coupled to the system 102. The system 102 may communicate with the external repository through the interface(s) 204 to obtain information from the data 214.

Further, as mentioned above, the system 102 can communicate with the multi-layered database 104, either directly or over the network 108, to store data to, retrieve data from, and edit data in the multi-layered database 104.

Data Storage in Multi-Layered Database

In operation of storing of the data, the multi-layered database 104 can first be created or deployed. For creating the multi-layered database 104, a user or a developer can send an input to the operation module 120. The input can include, for example, bulk information related to multiple real world entities and their action capabilities. The bulk information can refer to, for example, a file or folder comprising information related to a plurality of real world entities and their action capabilities in a format usable to upload the information into the multi-layered database 104.

Further, as mentioned above, the multi-layered database 104 can include following three layers:
1. The action graph layer 126,
2. The standard graph layer 128, and
3. The backend database layer 130.

1. Action Graph Layer

In an implementation, for creating the multi-layered database 104, the operation module 120 first creates the action graph layer 126 to store the information in graphical form. The action graph layer 126 includes the real world entities stored as participant-entity nodes and the action capabilities of the real world entities stored as action nodes. Further, action graph layer 126 includes the corresponding node properties, their associated relationships and properties associated to such relationships, wherein the relationships relate, as edges, two action nodes, or a participant-entity node and an action node, or two participant-entity nodes.

In an example, the action capabilities of the real world entities may be broadly categorized into two categories. One is entity's capability. i.e., "What an entity is capable of doing". For example, what can a car do? (a car can start, a car can move, etc.). And the other is "How the capability of the entity is achieved?" i.e., what would a user of a system like to do with an entity, or what information a user would like to extract from an entity. For example, How to drive a car? (What are the processes/steps involved in driving a car).

Participant-Entity Node:

The action graph layer 126 includes the real world entities stored as the participant-entity nodes, and relationships stored as edges. Thus, the participant-entity nodes are connected though the edges representing the participant relationship among the participant-entity nodes. The participant-entity nodes and the edges have respective participant properties stored as key value (k, v) pairs. Further, in an example, the participant-entity nodes are inter-related to each other through participant relationships, such as a parent-child relationship or inheritance relationship, a constituent relationship, and a general relationship.

In the parent-child relationship or inheritance, one participant-entity node can be represented as a parent participant-entity node and the related participant-entity node as a child participant-entity node. The child participant-entity node inherits properties including constituent relationships and general relationships from the parent participant-entity node of which the properties are known. Also, any additions or updates on the parent participant-entity node can be applicable to its child participant-entity node. Further, the child participant-entity node can decide to add, modify, or override, one or more properties of the corresponding parent participant-entity node to provide specialized properties. Further, the child participant-entity node can inherit constituent relationships of its corresponding parent participant-entity node, and can also override the constituent relationship for adding a specialization to the constituent relationships of the corresponding parent participant-entity node for the child participant-entity node.

In the constituent relationship, one participant-entity node is constituted of or includes one or more constituent participant-entity nodes. The constituent relationship can facilitate in defining "has*" relationships among the participant-entity nodes. For example, a participant-entity node "shopping cart" can have constituent relationship with a participant-entity node "purchase item".

The general relationship may include a general association between two or more participant entity nodes, which may further be user defined. In one implementation, general relationship may include a dummy relationship between the parent participant entity node and the child node. For example, the fact that "Dog is a friend" does not in its true sense signify that 'Dog' is a child node and 'friend' its corresponding parent node. 'Dog' may not inherit all the properties of a 'Friend', and hence, such participant entity nodes (Dog, friend) may be connected by a dummy relationship instead of an inheritance relationship.

Figure 3:
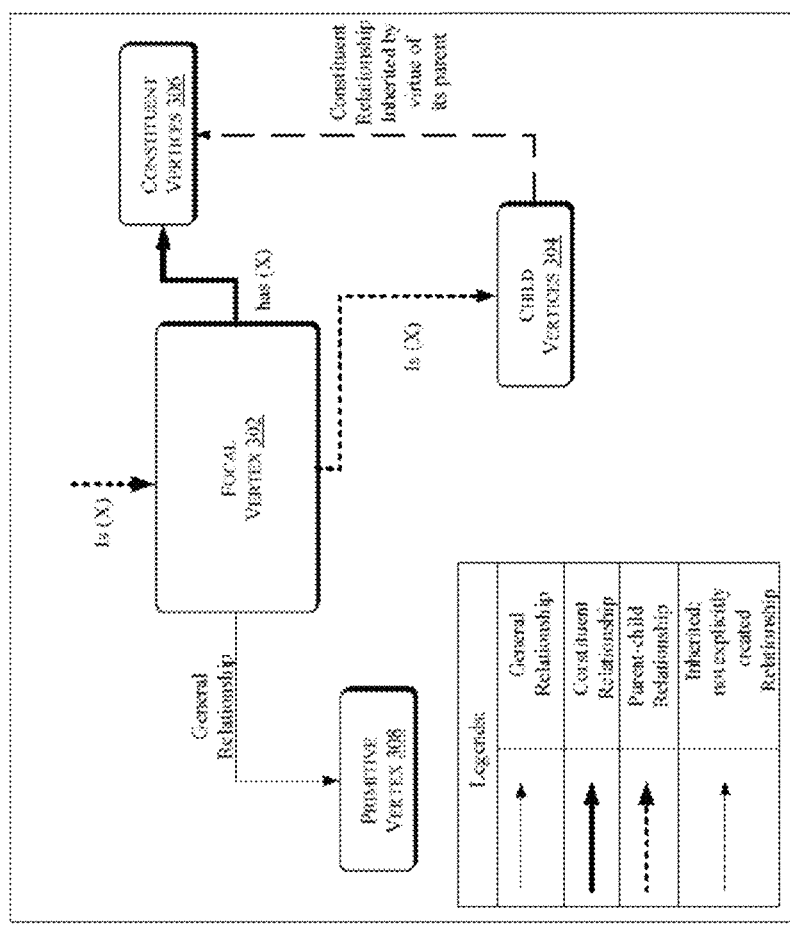
FIG. 3 and FIG. 4 illustrate how relationships between the nodes in an action graph layer are represented and manipulated, in accordance with an implementation of the present subject matter.

FIG. 3 illustrates how participant relationships between the participant-entity nodes in the action graph layer 126 are established. It will be understood that the participant relationships between underlying nodes in the standard graph layer 128 will also be similarly established. A focal vertex 302 can be considered as the parent participant-entity node. The focal vertex 302 can constitute child vertices 304. The child vertices 304 can be considered as the child of the parent participant-entity node. Participant relationships between focal vertex 302 and child vertices 304 can be represented by 'isA' relationship. Also, the focal vertex 302 can be constituted of or include constituent vertices 306. Participant relationship between focal vertex 302 and constituent vertices 304 can be represented by 'has*' relationship. The focal vertex 302 can further be connected to primitive vertex, i.e., primitive node through general relationship. The general relationship can help in defining associations at a participant-node level and may or may not be inherited by child the participant-entity nodes.

Figure 4:
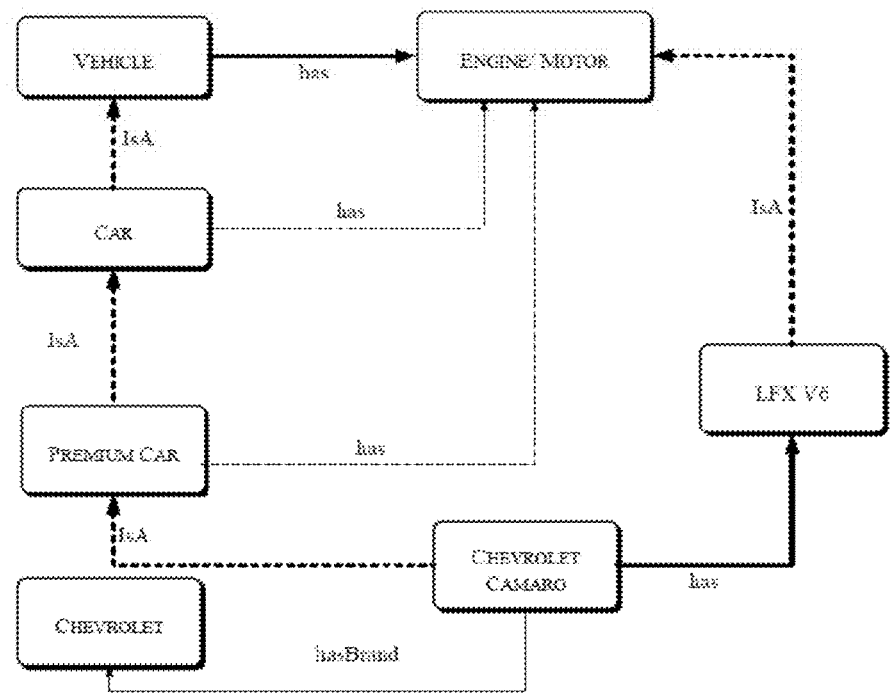

For example, as illustrated in FIG. 4, vehicle can be considered as focal vertex 302. Vehicle has engine, therefore vehicle is related to engine/motor through constituent relationship which is represented as 'has*.' Also, car is a vehicle; vehicle is focal vertex for car, therefore car and vehicle are related with parent-child relationship which is represented as 'isA.' Further, car has a child vertex represented as premium car. Hence, relationship between the car and premium car is represented as 'isA.' Similarly, parent-child relationship being developed between premium car and Chevrolet CAMERO. Chevrolet Camero and Chevrolet, and engine/motor and LFX V6. In general, every car has an engine. Therefore, every car is constituted of an engine/motor. In other words, the engine/motor is a constituent of car. Therefore, relationship between the car and engine/motor is represented as 'has*.' Similarly, constituent relationship can be developed between vehicle and engine/motor, premium car and engine/motor, and Chevrolet Camero and LFXV6.

Action Node:

In addition to storing the real world entities as the participant-entity nodes, the action graph layer 126 stores the action capabilities of the real world entities as separate nodes, i.e., action nodes. That is, the action capabilities of the real world entities are stored as action (verb) nodes in the action graph layer 126. Such action capabilities of the real world entities are then represented as a graphical node rather than a relation/edge connecting two participant-entity nodes, as in the case of predicate logic or RDF triple-stores or any common graph database/storage. By doing so, the action graph layer 126 improves the flexibility to attach more than one real world entity or participant, viz., subject, object as fact, entity, or literal, to the capability/action node, thereby facilitating many-to-many mapping between an action node and a plurality of participant-entity nodes. Further, inheritance property of capability or action can easily be represented if it is stored as a node, wherein the step relations or properties of the parent action node can be inherited to its child action node, with overriding capability, as described in detail below.

Moreover, the action graph layer 126 is enabled to store and modify the context of the action node with respect to its participant-entity nodes, as a property attached to it. One feature of the action nodes is that they have relationships called step relationships to represent the whole process steps of an action.

Further, an action node in the action graph layer 126 may further possess the following properties such as to identify the context of a particular action/capability:
ActionNodename/hasAction: <Node ID of Action verb>
ParticipantNodename/hasParticipant: <Node ID of Participant>
ModifierNodename/hasModifier: <Node ID of Modifier>
IncomingActionName: <Node ID of incoming Action Verb>
OutgoingActionName: <Node ID of outgoing Action Verb>
ActionnodeQuantity/hasQuantity: <Standard unit Quantity of the Participants>
Parameter/hasParameter: <Parameters to define the action Node>

Herein, the Node ID may further refer to the Node Name.

The "hasAction" property represents the name of the action/capability being represented by an action node. Those skilled in the art would appreciate that the actions are context-sensitive in nature, as the capability of a given set of participant entity nodes depends on these participant entities. Further, each action may be associated with a distinct and unique context. Hence, the action graph layer 126 incorporates a provision to capture the context of a particular action node based on its participant entity nodes (viz., subject(s) and object(s)). The subject represents an entity that can do that particular action, whereas the object represents entities upon which the mentioned action may be performed. The "hasParticipant" property represents the corresponding subject name and object name pertaining to the action verb/capability. The action nodes may further include certain modifiers such as adverbs, adjectives, etc., for appropriate identification of context of a particular action. The "hasModifier" property may further represent such modifiers and hence enable the system 102 to capture the context appropriately. It has to be noted here that each action node in the action graph layer 126 may have multiple properties, in case many participant entity nodes or modifiers are attached to it.

Figure 5:
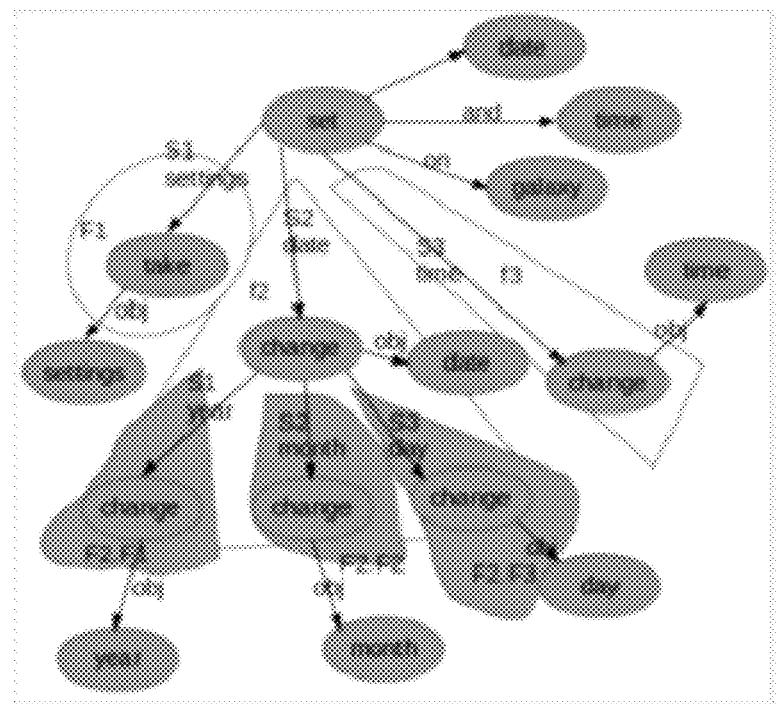
FIG. 5 illustrates exemplary representation of the action nodes having step relationships in the action graph layer, in accordance with an implementation of the present subject matter.

Referring to FIG. 5, consider the case of "How to set date and time on Galaxy?" In this case, the "change" in the frame F2 corresponds to "change date", whereas the change action in the sub-frame F2.F1 corresponds to "change year". Similarly, the change action in the sub-frame F2.F2 corresponds to "change month", and in the sub-frame F2.F3 corresponds to "change day". Further, the "change" action in the frame F3 corresponds to "change time", as each one of the above frames have the same action node but with different objects signifying the context in which the action verb "change" is being implemented.

The context capture may further enable the system 102 to derive the underlying semantic meaning of an action verb. For example, the actions "How to manufacture chair?" and "How to manufacture cement?" use same action verb "manufacture" in totally different scenarios. Such scenarios may easily be distinguished with the help of the object nodes associated with the action graph layer 126, which represent the context of occurrence of a particular action.

Figure 6:
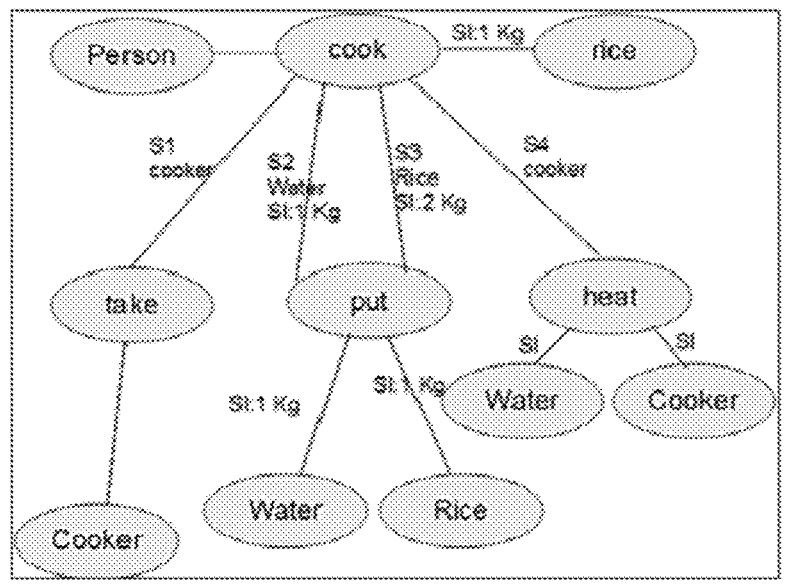
FIG. 6 illustrates quantization of the exemplary relationships as parameters of the action nodes in the action graph layer, in accordance with an implementation of the present subject matter.

The "hasQuantity" property of the action node enables the user of the system 102 to quantize the action node in terms of its participant-entity quantities, thus allowing scalability in the multi-layered database 104, without expanding the graph. For example, FIG. 6 represents 'how to cook 1 kilogram of rice with respect to its corresponding participant-entity's quantities at different steps/levels of abstraction of action process. This can be parsed to obtain information about 'how to cook 10 kilograms of rice' by simple traversal operator on the action graph layer 126. Such "hasQuantity" property may further be stored in a columnar backend database layer associated with corresponding unique action node ID to facilitate indexing mechanism for faster retrieval of information in a particular context.

Further, the "IncomingAction" property and "OutgoingAction" property of the action node may further enable the system 102 to identify a super-step and a sub-step for a particular action node.

Figure 7:
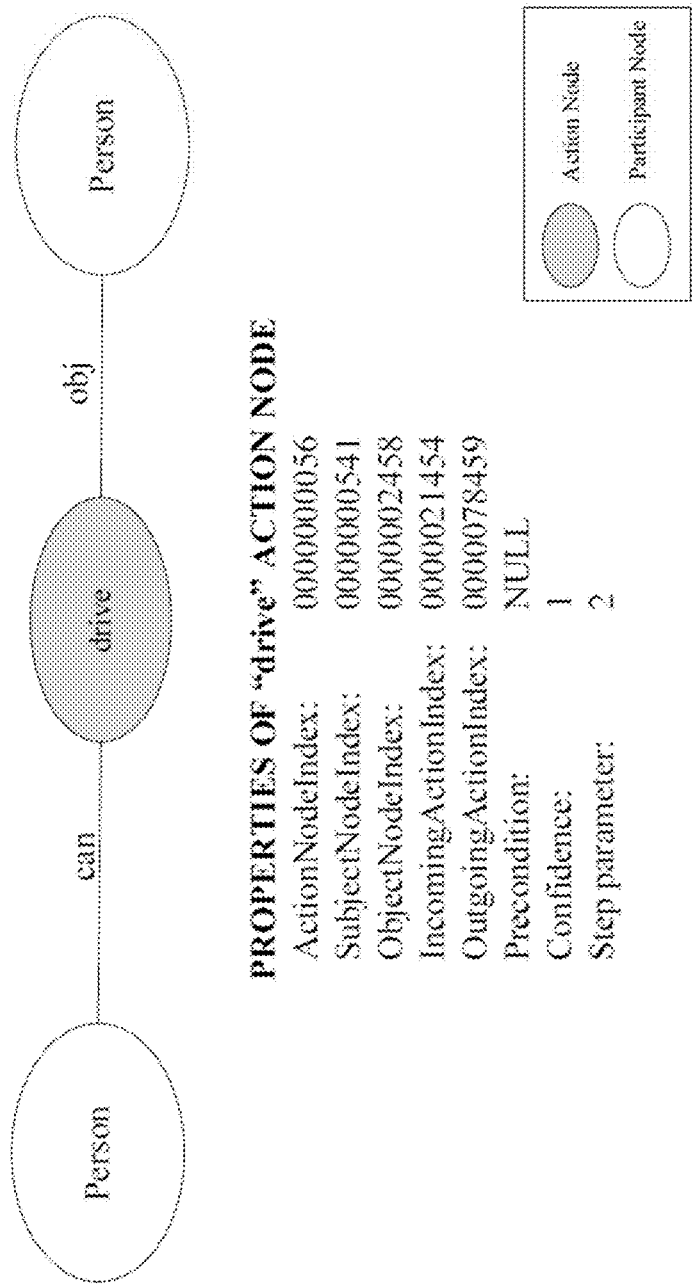
FIG. 7 illustrates an exemplary representation of an action node along with properties in the action graph layer, in accordance with an implementation of the present subject matter.

FIG. 7 illustrates an exemplary elucidation of action node representation in the action graph layer 126, in accordance with the present subject matter. In FIG. 7, the action node further comprises various parameters to define certain properties associated with the action node.

Figure 8:
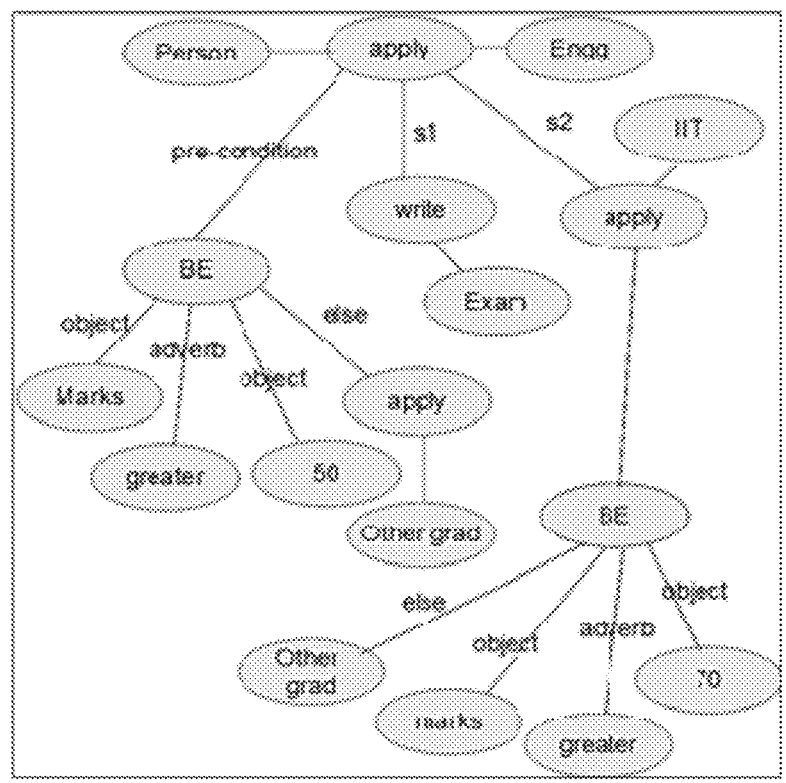
FIG. 8 illustrates an exemplary representation of the action graph layer along with action nodes and participant-entity nodes, in accordance with an implementation of the present subject matter.

In an example, the action properties further include parameters having at least a pre-condition parameter, a step parameter and a quantity parameter, where a precondition parameter captures pre-conditional actions necessary for an action to be performed, a step parameter stores the level of granularity up to which the user would like to retrieve information in case of read operations, and a quantity parameter quantizes the action node in terms of its participant-entity quantities For example, as illustrated in FIG. 8, consider a case of "How to apply for Engineering". In this case, the "pre-condition" parameter is that marks of a student have to be greater than 50% in order to apply for engineering. Thus, in the example represented in FIG. 8, "BE" action node is a pre-condition for an action node "apply".

Further, in an example, "confidence" parameter may also be included in the action node to suggest the accuracy confidence associated with the capability/process steps, which may further be contextual in nature.

In one implementation, a "step parameter" of an action node enables the user to store the level of granularity up to which the user would like to retrieve information in case of read operations. In other words, in case the user wishes to retrieve the capability of a real world entity, the system 102 has a provision for the user to mention the number of levels to which the user would like to retrieve the process. For example, in case the user would like to know "How to make coffee", the process can start from sow the coffee beans, germinating the coffee beans, and so on, till add sugar, heat milk and add coffee powder. However, retrieving the entire process may be absurd, and the user may only be interested in the last three steps mentioned above. Here, the user may select the required step levels, thus simplifying the retrieval operation. This information may be stored as a property 'step parameter' in the action node.

It will be appreciated by those skilled in the state of the art that each action node may have multiple properties associated with them, and some of the properties may further be null or void depending upon the capability representation in the action graph layer 126.

Action-Participant Entity Relationships: (Many-to-Many Participants Mapping)

Figure 9A:
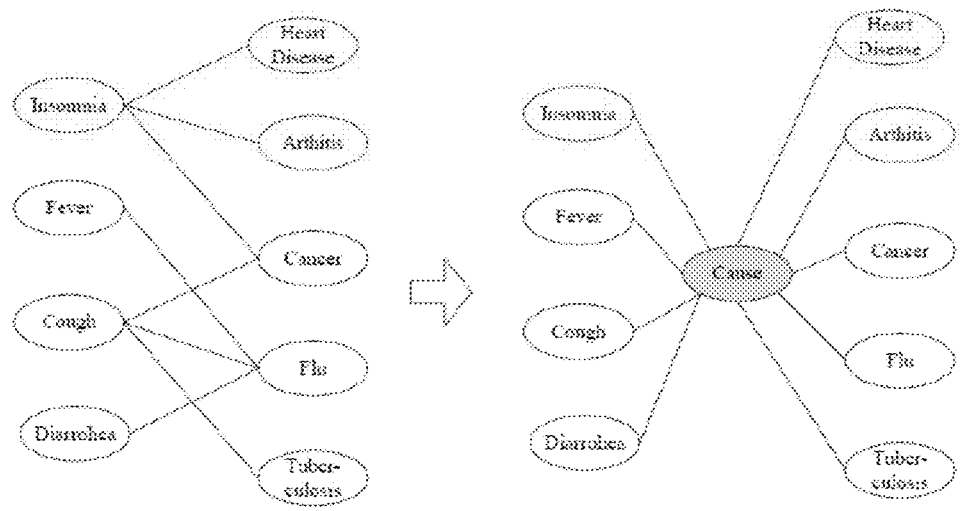
FIG. 9a and FIG. 9b illustrate exemplary representation of many-to-many mapping between participant-entity nodes through the action nodes in the action graph layer, in accordance with an implementation of the present subject matter.

One of the core concept behind storing the capability of a real world entity as a node, and not a relation in the action graph layer 126 is that the participant subject-object pairs generally showcase many-to-many mapping, which is not representable in the existing graph databases. The present subject matter facilitates many-to-many mapping between a plurality of participant-entity nodes (viz., subject nodes and object nodes) via a singular action node representing the capability of the respective participant-entities. For example, in a medical domain, it is a commonly known fact that a plurality of symptoms may 'cause' singular disease as well as singular symptom may 'cause' a plurality of diseases. For example, Insomnia may be a symptom for various diseases, such as Heart disease, arthritis, or Cancer. Similarly, a disease Flu may have various symptoms, such as fever, cough, and diarrhea. In this case, it is crucial to ensure such flexibility in the knowledge representation schema, and action graph representation enables many-to-many mapping between a plurality of participant entities via a common or singular action node (capability), as illustrated in the FIG. 9a.

Figure 9B:
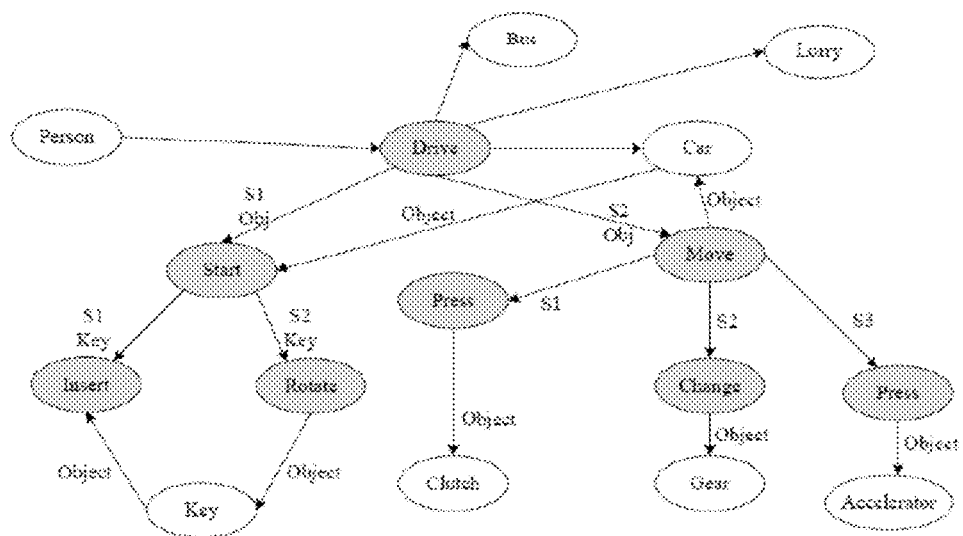

In an implementation, the action nodes are connected to at least one of the participant-entity nodes by action-participant relationships, where the participant-entity nodes may be subject nodes (subject of the capabilities), object nodes (object of the capabilities), or primitive literal string nodes, thus facilitating many-to-many participant-entity mapping. As illustrated in FIG. 9b, the action-participant relationships may include a modal relationship to connect the action nodes with the participant-entity nodes (which may be the subject participant-entity), or a general relationship to connect a plurality of action nodes with the participant-entity node (which may be an object node or the primitive literal string nodes). In an example, the modal relationship represents the modal auxiliary verbs connecting the participant-entity nodes (viz. subject nodes) and the action nodes, such as can, will, shall, may, might, could, must, ought to, should, would, used to, need, and the like. The modal relationship may not have any further properties or indexing mechanism associated with them. Similarly, in an example, the general relationship may include, but not limited to, is, has, have, and so on.

Figure 10:
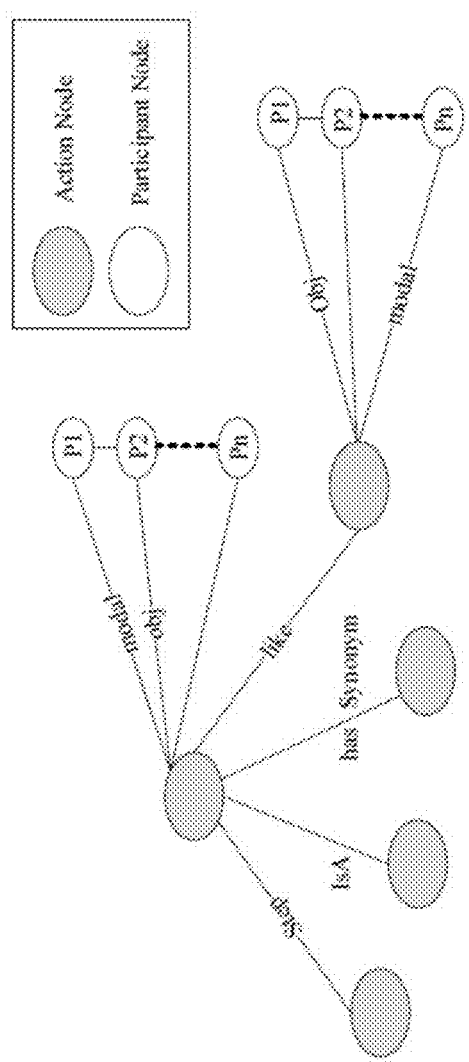
FIG. 10 illustrates exemplary relationships between action nodes and between the action nodes and participant-entity nodes in the action graph layer, in accordance with an implementation of the present subject matter.

FIG. 10 illustrates many-to-many mapping between subject and object nodes via the action node 'drive'. In FIG. 10, the action node 'drive' is mapped to many object nodes viz., 'bus', 'lorry', and 'car', from a common subject node 'person'. The steps for 'drive' are same for all the objects.

Action Node Relationships:

In an implementation, two or more action nodes can be inter-related by any one of the following action relationships:

a. Inheritance (isA) relationship.
   b. Step relationship.
   c. Constituent (Synonym) relationship, and
   d. Like relationship (concept to real factorization).
   a. Inheritance (isA) Relationship:

Inheritance in the action nodes may be identified as a means to specify a specialized action node representing a child action node that inherits certain frames or steps of an existing action node representing a parent action node of which at least one step relationship is known, such that any additions or updates on the parent action node would be applicable to the child action node. The child action node may be associated with the corresponding parent action node by "isA" relationship. In one implementation, the properties associated with the inherited frame (step relation) may help in distinguishing the child action node. For example, the child action node may decide to void or nullify one or more of its corresponding parent action node's step relationships properties. Further, the child action node may override any of its corresponding parent node's step relationship's properties to give specialized properties.

Figure 11A:
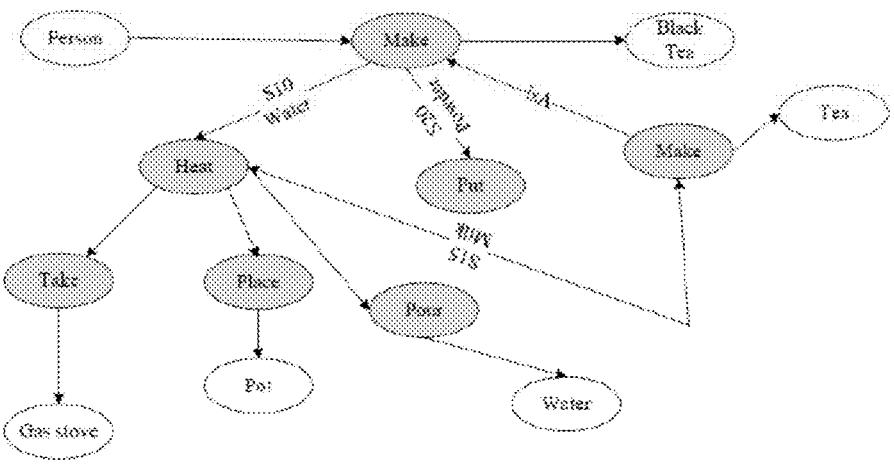
FIG. 11a and FIG. 11b illustrate exemplary representation of the action nodes having inheritance relationships in the action graph layer, in accordance with an implementation of the present subject matter.

For example, as illustrated in FIG. 11a, consider a case "How to make tea" as a child for "How to make black tea". In this case, the child inherits all the steps of the parent viz. S10—heat water, and S20—put powder. Along with these steps, the child action node may possess another step S15—heat milk, which is not associated with the parent action node. In this case, the step S15 is an intermediate step between step S10 and step S20.

Figure 11B:
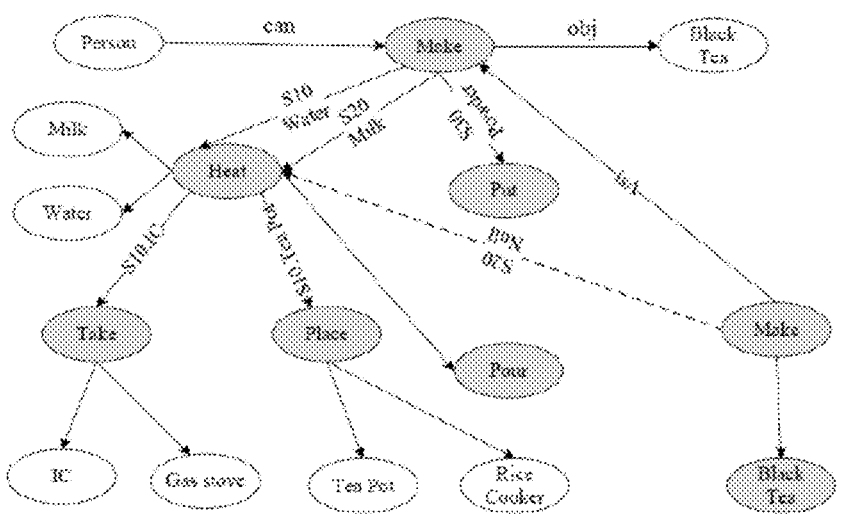

In another implementation, the child action node may also possess the capability to override some of the properties of the corresponding parent action node's step relationship. For example, as illustrated in FIG. 11b, consider a case where "How to make black tea?" is a child action node of a parent action node "How to make tea?" In this case, the steps S10—heat water, S20—heat milk, and S30—put tea powder are inherited by the child action node "make black tea'. However, the step relationship S20 is overridden by passing the parameter as NULL, instead of MILK so that the step S20 (heat milk) can be avoided in "make black tea" action node.

b. Step Relationship:

The action nodes may further be inter-related to one or more action nodes by step relationships S1, S2, S3, and so on, as illustrated in FIG. 6. The step relationship represents the series of steps/processes involved in completing a particular action. Those skilled in the art would appreciate that each action node may have many steps which in turn may be connected to other action nodes, and this representation may be percolated to any number of granular levels. The step relationship may further possess various properties for enhancing the traversal mechanism in the action graph layer 126.

In one implementation, the step relationship may be represented as follows:

00000000001#[I][S]S1#00000000002
     wherein "I" denotes Incoming action, "S" denotes the Outgoing action and "S1" denotes step relation.
   00000000001 denotes the Start Action node Id
   00000000002 denotes the End Action node Id Such step relationships between two action nodes enable a layer/frame representation of an enterprise knowledge base, wherein each frame may comprise an action node along with the associated action node and the step relationship. These frames may further be associated to other frames, referred to as the sub-frames and/or super-frames which enhance the scalability and flexibility of the action graph layer 126 by enabling re-use of such frames in various processes. This progressiveness in the action graph layer 126 may be ascertained to any number of granular layers, thus expanding the scope of an action/capability.

For example, as illustrated in FIG. 5, consider a case about "How to set date and time on Galaxy phone?" In this case, the action "take" along with participant-entity "settings" and step S1 form a frame F1. Similarly, frames F2 and F3 are for changing date and time respectively. The frames F2 and F3 may further have sub-frames associated with them. For example, the frame F2 further comprises a sub-frame F2.F1 for changing year, a sub-frame F2.F2 for changing month, and a frame F2.F3 for changing day.

In an implementation, the step relationship may further possess the following properties, along with an indexing mechanism:

Start Node: <start node Id>
   Start Node Name: <start node name>
   End Node: <end node Id>

End Node Name: <end node name>
hasStep: <step label>
hasObjParam: <Object name>
hasOrder: <order of step>
hasQuantity: <quantity>

For example, as illustrated in FIG. 10, consider a case about "How to drive car". The step S1 inter-relating an action node "drive" and an action node "start" may possess the following properties attached to the step relationship.

Start Node: 00000000001
Start Node Name: drive
End Node: 00000000002
End Node Name: start
hasStep: step_drive_start
hasObjParam: car
hasOrder: 1
hasQuantity: NULL The parameterization of the step relationship enables capturing context that may further be utilized during graph traversal. Further, the "hasOrder" parameter enables the system 102 to quantize the parameters involved in the step relationship. For example, if the knowledge representation comprises the process for "How to cook 1 kilogram of rice?" the same may be used to identify the process for "How to cook 10 kilogram of rice?"

c. Constituent (hasSynonym) Relationship:

It is commonly observed that most of action verbs or capabilities may be represented by multiple synonyms, such synonyms further being contextual in nature. The underlying architecture of the knowledge representation based on the action graph layer 126 enables the system 102 to capture and store the various synonyms of action verbs as action nodes associated with the corresponding actions. Such Synonyms are associated based on their context of occurrence, thus leading to a more efficient and scalable knowledge base.

The synonyms are also represented as the action nodes in the action graph layer 126, and are associated with the corresponding synonymous action nodes with "hasSynonym" constituent relationship. Further, all the associated step action nodes may have a provision to access the corresponding synonym action node. When a synonym for an action node is created, the properties of the action node are also attached to its synonyms. The synonyms node is also an action node. But when the properties of synonym node are indexed, a reference id (document id for distributed indexing architecture) of an actual action node is given so that the control will be delegated to the actual action node. In accordance with the present subject matter, same capability/action can have different synonyms in different context.

Figure 12:
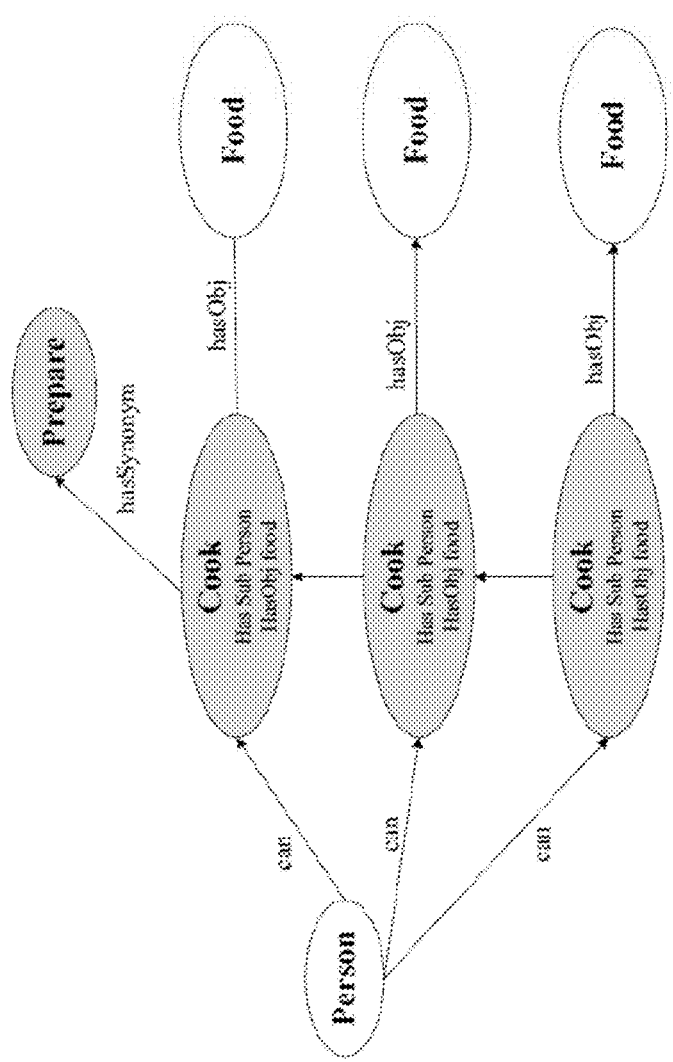
FIG. 12 illustrates exemplary representation of the action nodes having synonym relationships in the action graph layer, in accordance with an implementation of the present subject matter.
Figure 13:
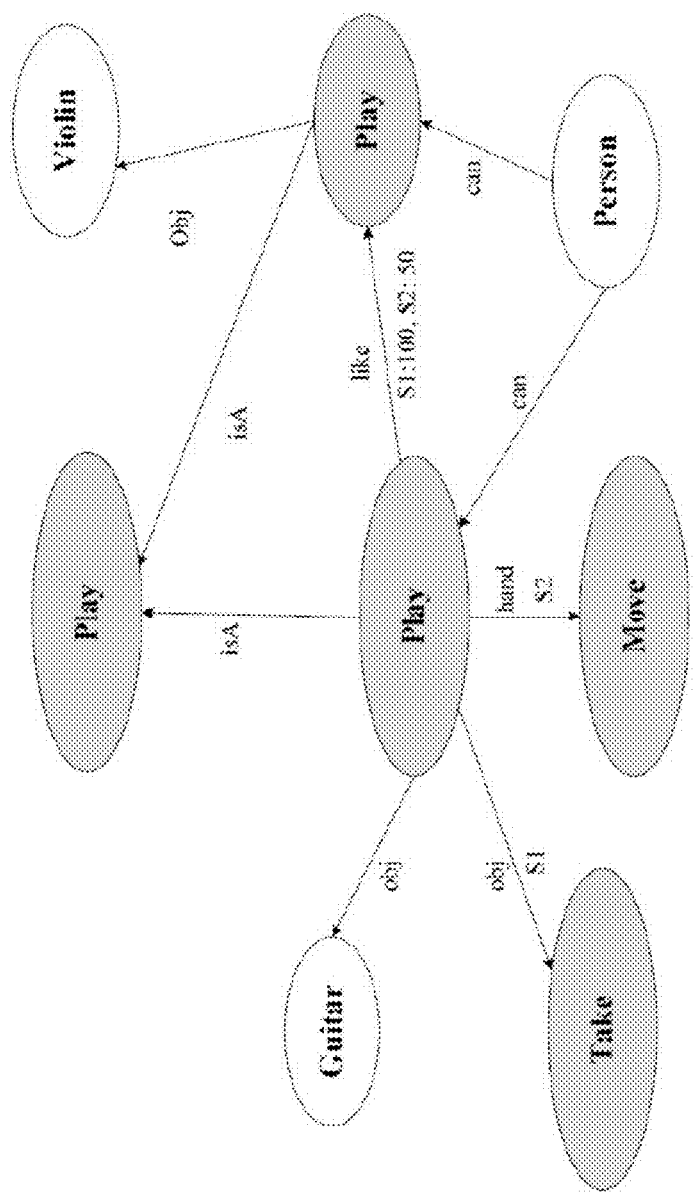
FIG. 13 illustrates exemplary representation of the action nodes having like relationships in the action graph layer, in accordance with an implementation of the present subject matter.

For example, in FIG. 12, the synonym "prepare" is associated with the parent action node "cook food" such that all the child action nodes, viz., "cook tea", "cook black tea" etc., may be inherited by the synonym "prepare". Also, when indexing the synonym action node (prepare), the indexing is done against a document id of the parent action node (cook food) and document ids of the child action nodes (cook tea, cook black tea).

d. Like Relationship (Concept to Realization Factorization):

Further, in one implementation, the action nodes may further possess "like relationship" with similar action nodes, along with a confidence property associated with them. In case the capability/definition of the action node is not known, the "like relationship" enables the system 102 to identify the capability of a real world entity, based on other similar capabilities. For example, as illustrate in FIG. 13, consider a case of "How to play violin?" Assume that "play Violin" action capability is unknown. But knowledge representation has stored the steps for "play Guitar" action. In this case, if the system 102 identifies that the 'play violin' is similar to 'play guitar' action, then the system 102 associates the two actions via "like relationship". The "like relationship" may further possess a confidence value represented as a (key, value) pair, which is obtained based on a pre-defined rule set. The confidence values may enable the system to determine how realistic the concept may be. In other words, the concept-to-real factorization may be achieved by incorporation of "like relationship" between two action nodes, based on the confidence parameter. Further, those skilled in the art would appreciate that the system 102 has a provision to give higher priority to action node associated with "like relationship" rather than those with inheritance (isA) relationship, if the confidence values are high. This enables the system 102 to generate more relevant and appropriate process steps for the actions under consideration.

2. Standard Graph Layer

Further, in accordance with the present subject matter, once the participant-entity nodes, the action nodes, and properties and relationships associated with them are created/stored in the action graph layer 126, the operation module 120 creates the standard graph layer 128 based on the action graph layer 126. The standard graph layer 128 stores the data of the action graph layer 126 in graphical form. For this, the participant-entity nodes and the action nodes in the action graph layer 126 are decomposed by the decomposer 120-1 of the operation module 120, into nodes, node properties, edges, and edge properties, wherein the nodes correspond to the participant-entity nodes and the action nodes, node properties are indicative of the properties of the participant-entity nodes and the action nodes, the edges are indicative of the relationships between a plurality of participant-entity nodes, a plurality of action nodes and an action node and a participant entity node, and the edge properties are indicative of the relationship properties of the of the participant-entity nodes and the action nodes. That is, each node in the action graph layer 126 has a one-to-one mapping with its corresponding node in the standard graph layer 128. For decomposing the action nodes and the participant-entity nodes into the nodes of the standard graph layer 128, the data and properties of the action nodes and the participant-entity nodes are stored as (key, value) pairs of the nodes in the standard graph layer 128, as can be seen in FIG. 14, which illustrates mapping of action graph layer 126 and the standard graph layer 128.

3. Backend Database Layer

The operation module 120 can further create the backend database layer 130. The backend database layer 130 can be created based on the standard graph layer 128. The backend database layer 130 can store data and metadata corresponding to the (k, v) pairs associated with the nodes and edges of the standard graph layer 128. The backend database layer 130 can further store the properties associated with the nodes and the properties associated with the edges as data and metadata, for example, using a BigData storage mechanism such as Hadoop. In an example, the data and the metadata include corresponding temporal data and metadata.

Figure 14:
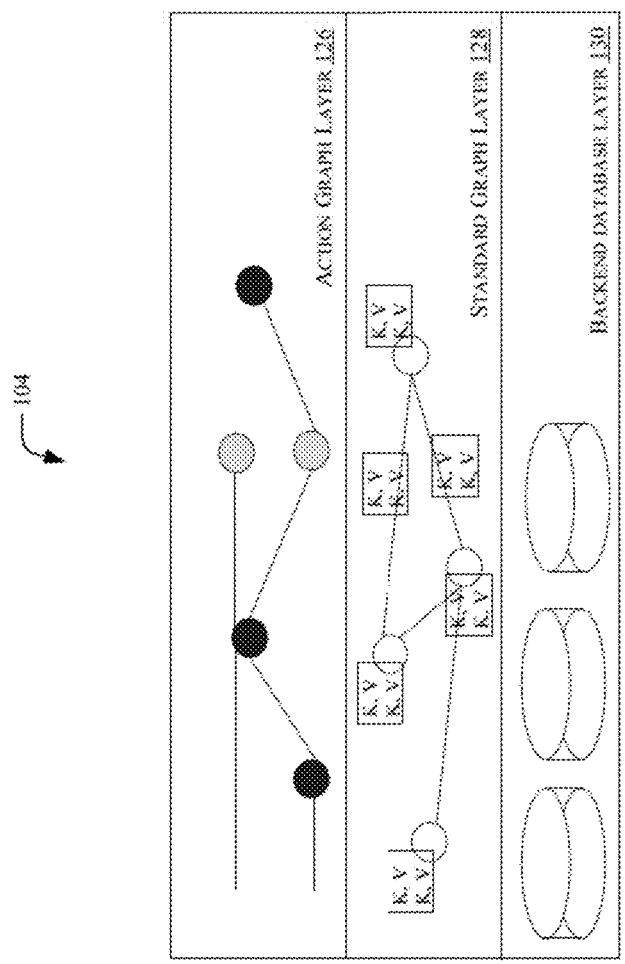
FIG. 14 illustrates mapping of action graph layer, standard graph layer, and backend database layer of the multi-layered database, in accordance with an implementation of the present subject matter.

Accordingly, the operation module 120 creates the multi-layered database 104 comprising the action graph layer 126, the standard graph layer 128, and the backend database layer 130, as shown in FIG. 14. Further, the multi-layered database 104, created in accordance with the present subject matter, is scalable and flexible in nature due to various features inherent in the action graph layer 126 of the multi-layered database 104. Yet further, the operation module 120 enables the user to perform various create, read, update, and delete (CRUD) operations on the action graph layer 126, wherein the user may perform both single entry operations as well as bulk data migration and loading in real time.

Further, each of the nodes and their respective key-value (k, v) pairs of the standard graph layer 128 can be indexed for faster search and retrieval. Thus the indexing architecture is a pluggable architecture, which resides between the standard graph layer and backend database layer, and aids in retrieving data from the backend database for indexed seek/query. In one implementation, for indexing, the nodes can be assigned with indices, such as Lucene indices. In another implementation, for indexing, the nodes can be assigned with customized indices. The multilayer database architecture thus provides a pluggable index-service architecture, wherein the ability to plug different types of indexing service based on the enterprise or user requirements. Each of the indices for objects and properties can be stored in tables.

In one example, for indexing, several tables such as, a document table, an index table, and an index datatype table, can be created. The document table includes information, in the form of document, corresponding to the nodes. The index table includes indices, such as key-value pair, assigned to the nodes. The index datatype table includes information pertaining to the type of indices, i.e., whether the indices are in the form of integer, strings, images, or the like. The index datatype table ensures that the indices stored to an index table are of same type. For example, an index is assigned to a value, i.e., age of an entity represented as a node; the datatype in this case is integer. Thus, the index datatype table ensures that only integer data would be stored for age of the entity. Use of these tables facilitates graph traversal of the standard graph layer 128, while retrieving the information corresponding to an object.

Data Retrieval from Multi-Layered Database

In operation of retrieval of the data, the API module 110 of the system 102 generates a Graphical User Interface (GUI) for receiving a query from a user to retrieve capability information from the multi-layered database 104. The query may include at least a participant-entity node representing a real world entity and an action node representing a capability of the real world entity. The capability information includes data and metadata associated with the participant-entity node and the action node. In an implementation, the participant-entity node may further be inter-linked to another participant-entity node via at least an inheritance (isA) relationship, constituent (has*) relationship and a general relationship. As discussed above, each of the real world entities may be associated with their respective attributes including properties of the real world entities and information indicating how the various real world entities are interrelated. Similarly, each of the action capabilities or, simply, capabilities of the real world entities may be associated with their respective attributes including properties of the capabilities and information indicating how the various capabilities are interrelated. In an implementation, action node may further be inter-linked to another action node via at least one of an inheritance (isA) relationship, a concept to real factorization (like) relationship, a constituent (has*, e.g., hasSynonym) relationship, and a level/frame (step) relationship. Further, an action node may be inter-linked to a participant-entity node via at least a modal relationship or a general relationship.

Figure 15:
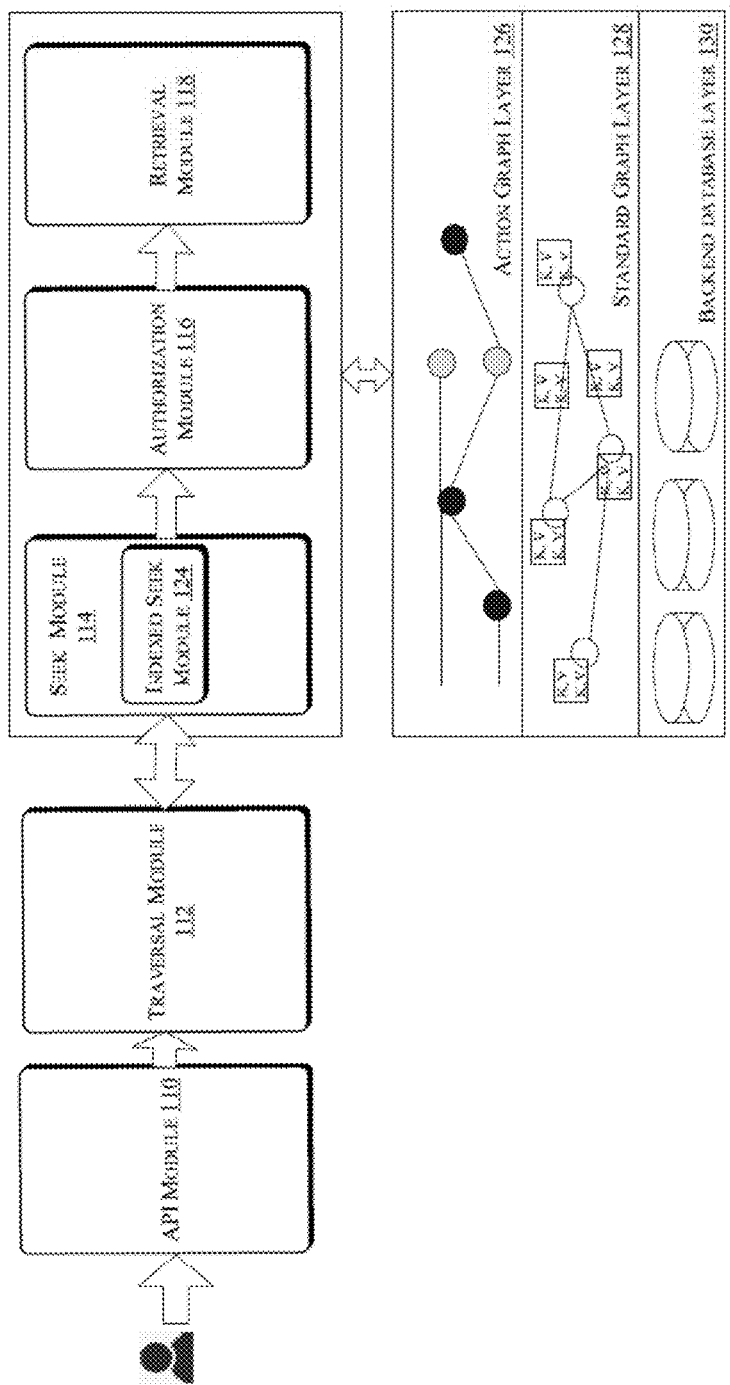
FIG. 15 illustrates an exemplary implementation of the system for retrieval of data stored in the multi-layered database, in accordance with an implementation of the present subject matter.

In accordance with an implementation shown in FIG. 15, the API module 110 may be a REST based API (standalone server mode) for small volume data operations, or may be based on a native access layer (embedded mode) for performing embedded operations with the requisites of high availability and low latency. In present implementation, the "standalone server mode" may be designed to support a language/framework that can send HTTP requests and receive HTTP responses, whereas the "embedded mode" may require the present subject matter to be implemented in JAVA environment. In present implementation, the API module 110 may invoke the traversal module 112 that comprises various services for identifying a traversal logic of traversing the action graph layer 126 for retrieval and execution of the data from standard graph layer 128.

Figure 16:
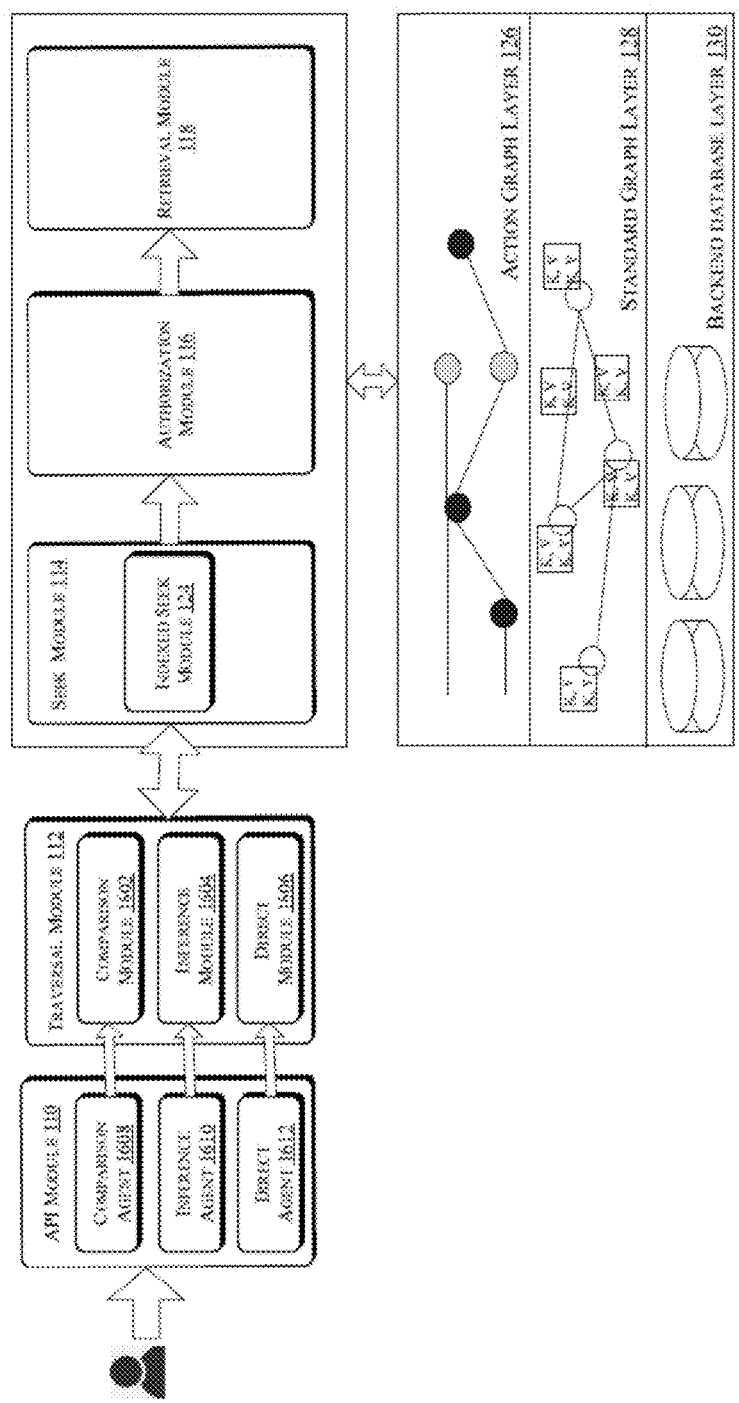
FIG. 16 illustrates an exemplary another alternative implementation of the system for retrieval of data stored in the multi-layered database, in accordance with an implementation of the present subject matter.
Figure 17:
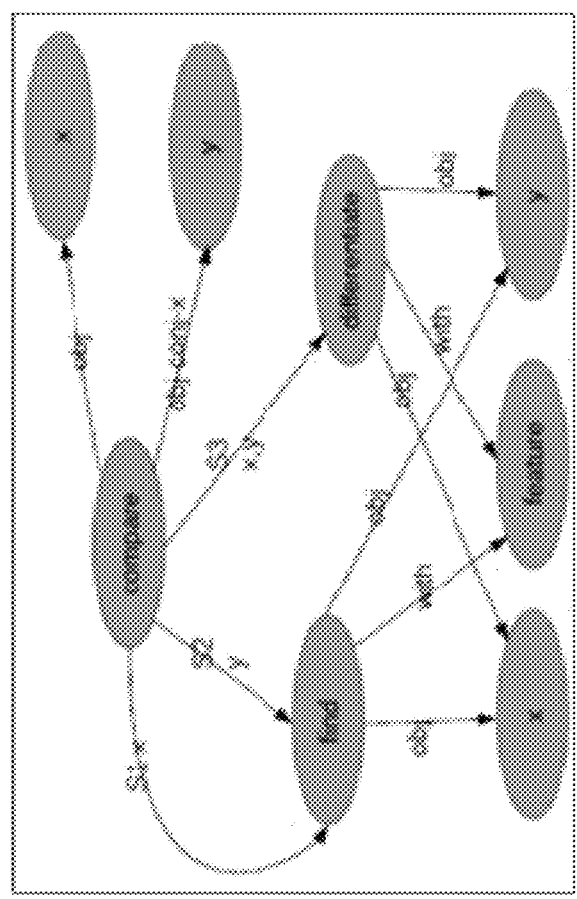
FIG. 17 illustrates an exemplary action graph representation for comparison service of the system for retrieval of data stored in the multi-layered database, in accordance with an implementation of the present subject matter.
Figure 18:
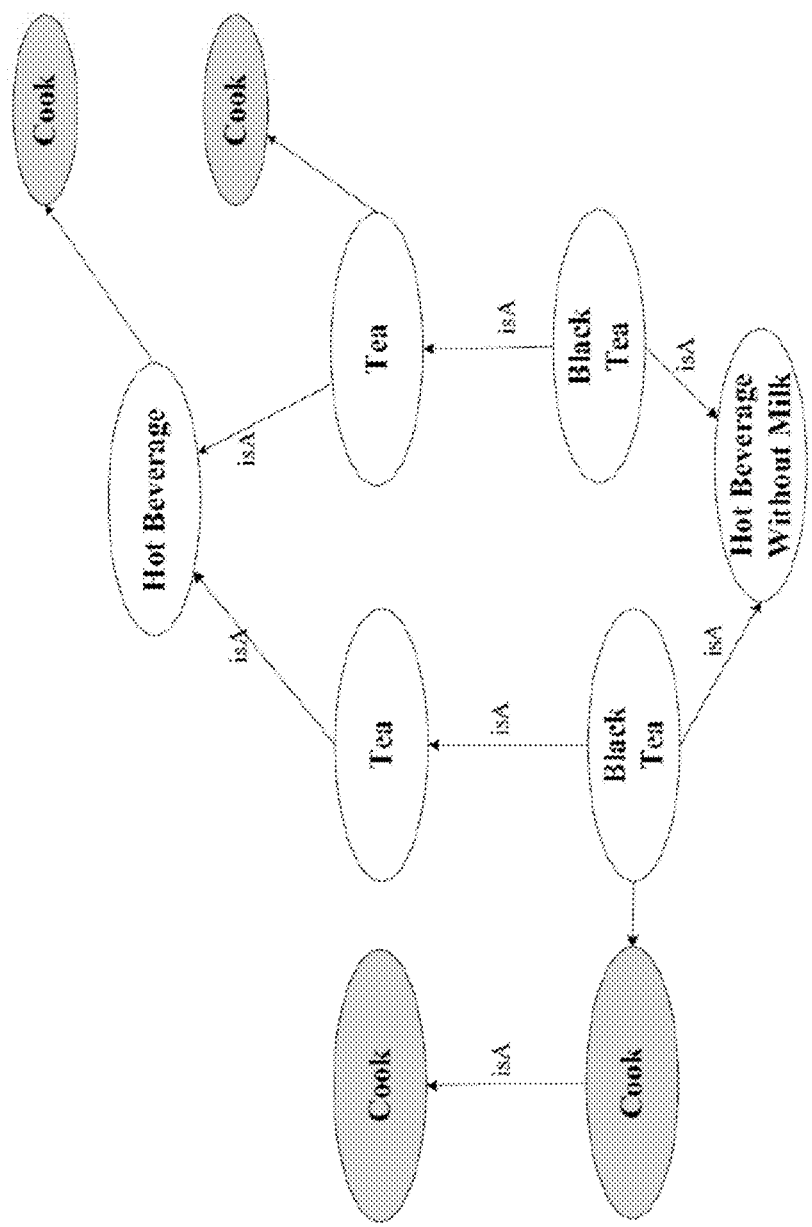
FIG. 18 illustrates an exemplary action graph representation for inference service of the system for retrieval of data stored in the multi-layered database, in accordance with an implementation of the present subject matter.

In accordance with another alternative implementation shown in FIG. 16, once the user poses the query to the system 102, the API module 110 may invoke a module/service from amongst one of a comparison module 1602, an inference module 1604, and a direct module 1606 in the traversal module 112. In an example, the API module 110 invokes the module in the traversal module 112 to classify the query based on user's requirement. For example, if the user requests for comparison of any two capabilities/actions or for comparison of two participant-entity nodes attached to a common action node, a comparison agent 1608 in the API module 110 may invoke the comparison module 1602 in the traversal module 112. For example, the comparison module 1602 may be implemented in case the user inputs the query "How to compare X and Y". In this case, the action graph layer representation of "compare" capability/action may be used along with predefined rules to distinguish the features of X and Y, as shown in FIG. 17. Similarly, in case the user requests for the capability/process steps that does not pre-exist in the action graph layer 126, but may be inferred based on certain logics as defined in the traversal module 112, then an inference agent in 1610 of the API module 110 may invoke the inference module 1604 in the traversal module 112. Further, the inference module 1604 may comprise a pre-defined rule set to derive inferences on the data in the multi-layered database 104. In one example, the inference module 1604 may be invoked to derive the process for "How to make black coffee?" in case the multi-layered database 104 includes data about "How to make black tea?" and "How to make coffee?" The inference module 1604 then identifies that tea and coffee have the same parent "hot beverage", and hence, the procedure for black tea and black coffee may be similar. The inference module 1604 then tries to map the two existing action graphs to generate an action graph, as shown in FIG. 18, to identify the process for make black coffee. Besides the comparison module 1602 and the inference module 1604, the traversal module 112 also includes the direct module 1612 which is invoked by a direct agent 1612 of the API module 110 for simple graph traversal to retrieve the capability information about the action nodes and the participant-entity nodes represent in the graph action layer 124. Based on the invoked module/service, the traversal module 112 deciphers a traversal logic for traversing the action graph layer 126 for retrieval and execution of the data from the standard graph layer 128. In one of the implementations, an n-gram language model may be used for comparison, inference and traversal. In another embodiment, machine learning techniques (based on discriminative models with classifiers) may be used for classifying amongst comparisons, inferences and traversal. The objective of providing the API module 110 and the traversal module 112 is to make retrieval process easier and bring logic in data retrieval/analysis process. In another embodiment, the user has been given the authority to choose a module from the existing modules (viz., comparison module, inference module and traversal module.

Figure 19:
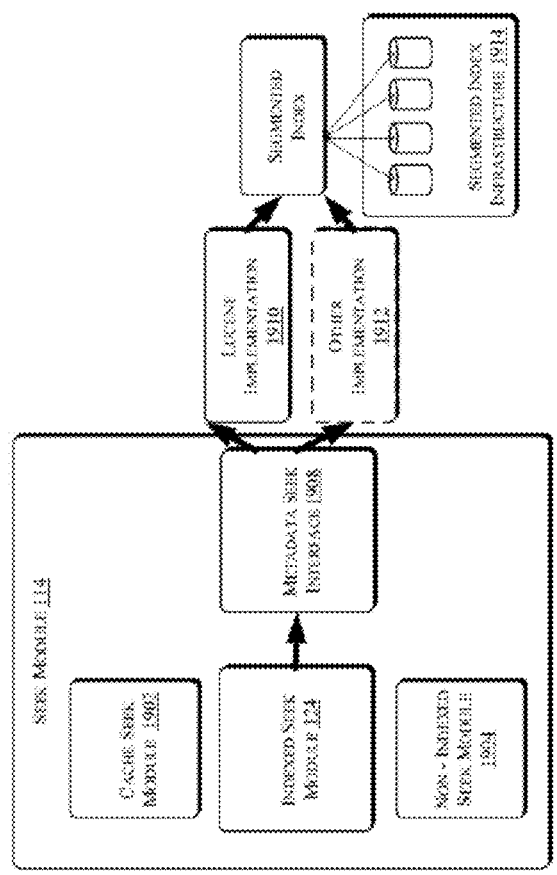
FIG. 19 illustrates a seek module of the system for retrieval of data stored in the multi-layered database, in accordance with an implementation of the present subject matter.

Further, once the traversal logic identified by the traversal module 112 in accordance with one of the implementations shown in FIG. 15 and FIG. 16, the seek module 114 facilitates the identification of the action node and the participant-entity node associated with the capability information to be retrieved from the underlying storage mechanism. Referring now to FIG. 19, which describes the seek module 114. The seek module 114 may include a cache seek module 1902, the indexed seek module 124, a non-indexed seek module 1906, a metadata seek interface 1908. The seek module 114 can receive a traversal logic from the traversal module 112 to seek action nodes and participant-entity nodes associated with the capability information to be retrieved. The seek module 114 can include the cache seek module 1902 that facilitates retrieval of capability information which is frequently accessed. Further, for retrieving the capability information from the backend database layer 130, the indexed seek module 124 and the non-indexed seek module 1906 can be implemented. The indexed seek module 124 enables to retrieve the capability information using an indexing infrastructure. In one example, the indexed seek module 124 can retrieve the action nodes with low latency and high throughput, with the help of an indexing mechanism designed a custom index layer. Such an implementation is developed by constructing a query parser along with tables for storing indices. Further, such an implementation may include a pluggable indexing service (not shown in figure) which may be invoked by one of the modules in the system 102 for an efficient seek and retrieval mechanism. In another example, the indexed seek module 124 indexes the participant-entity nodes, the participant properties, the action nodes, the action properties based on at least one technique that is pluggable to the backend database layer 130 of the multilayered database 104. In yet another example, the indexed seek module 124 can be based on Lucene index implementation 1910 on an index layer which includes index storage, or any other mechanism 1912 for seeking the data or the capability information from the action graph layer 126. The index storage can store the indices in a distributed storage infrastructure or a segmented index infrastructure 1914. However, a person skilled in the art would appreciate that the above mentioned implementations of the indexed seek module 124 would not limit the scope of the subject matter described herein.

Yet further, after identifying the capability information to be retrieved, access authorization of the user to the capability information associated with the action node and the participant is checked. For this, the authorization module 116 can check for access privileges of the user based on authorization credentials of the user. For example, the authorization credentials can be ID number and password. In one implementation, the authorization module 116 includes a field for entering authorization credentials by the user to check whether the user is privileged to access the capability information associated with the action node and the participant-entity node identified by the seek module 114. The authorization module 116 restricts the access of the capability information, associated with the action node and the participant-entity node, by the user if the user is not privileged to access the action node and the participant-entity node. However, if the user is privileged to access the capability information associated with the action node and the participant-entity node, the authorization module 116 provides access to the capability information associated with the action node and the participant-entity node to the user. In one implementation, the privilege is based on role-based security features. For example, an enterprise level encryption standard may be implemented on a predefined property dataset for defining security of accessing the capability information associated with the action node and the participant-entity node.

Further, when the user is privileged to access the capability information associated with the action node and the participant-entity node, the retrieval module 118 can retrieve the capability information corresponding to the action node and the participant-entity node from the backend database layer 130. For retrieving the capability information, the retrieval module 118 composes or reads the action node and the participant-entity node of the standard graph layer 128 after selecting the nodes, which are associated with the action node and the participant-entity node, identified as being relevant to the capability information being searched by the query of the user or the developer. As a result, the standard graph layer 128 need not be traversed to determine from which nodes is the capability information to be retrieved, and so execution time of the retrieval module 118 can be reduced as compared to conventional graph databases. Thereby, the system and the method of the present subject matter are efficient and fast.

In one implementation, the retrieval module 118 can retrieve the data and metadata present in the backend database layer 130 corresponding to the selected nodes of the standard graph layer 128. Based on the retrieved capability information, the retrieval module 118 creates and presents the action node and the participant-entity node corresponding to the capability information to the user. In another implementation, the operation module 120 can present the objects on the display 212 by highlighting the action node and the participant-entity node corresponding to the retrieved capability information.

Figure 20:
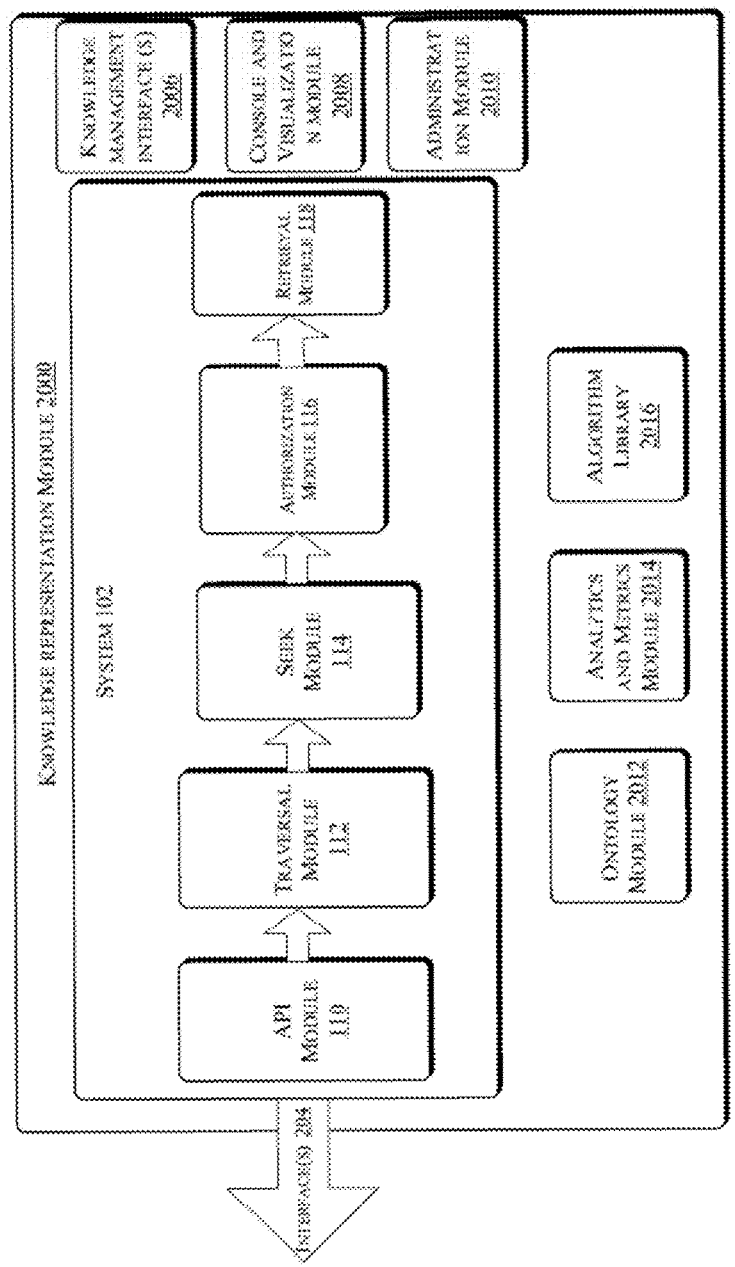
FIG. 20 illustrates various modules of the system for knowledge representation, in accordance with an implementation of the present subject matter.

Referring now to FIG. 20, which describes a knowledge representation module 2000, which can be a part of a larger information technology (IT) infrastructure, such as an enterprise's IT infrastructure or the cloud infrastructure. The knowledge representation module includes the system 102, the interface(s) 204, a knowledge management interface(s) 2006, a console and visualization module 2008, an administration module 2010, an ontology module 2012, an analytics and metrics module 2014, and an algorithm library 2016. The knowledge representation module 2000 can be implemented for knowledge management of an organization. Knowledge management (KM) may be understood as the process of capturing, developing, sharing, and effectively using knowledge of an organization. For knowledge management, it is required to input, update, delete, and merge knowledge corresponding to several teams, including several employees, projects, and business units of the organization.

The knowledge management interface 2006 can acquire knowledge as raw data from several input sources. These input sources, for example, can be web, mobile application, and the like. The knowledge acquired by the knowledge management interface 2006 can then be stored in a raw data storage (not shown in the figures). Using these stored raw data, facts or logics can be generated to represent the data through the knowledge representation module 2000. The knowledge management interface 2006 facilitates in managing knowledge corresponding to several teams of the organization. Knowledge related to several domains may be understood as ontology. The ontology may be understood as a formal framework for representing the knowledge. This framework can name and define several types, properties, and interrelationships of the entities in a domain. The ontology module 2012 can facilitate in naming and defining the types, properties, and interrelationships of the real world entities and action capabilities of the real world entities. For this, the ontology module 2012 reproduces a logical architecture of the organization, the real world entities, and the action capabilities of the real world entities, in the organization arranged in several relationships, such as parent-child relationship, constituent relationship or any other kind of relationship. This logical architecture can be based on a plurality of rules or algorithms. These rules or algorithms can be stored in the algorithm library 2014. The algorithm library 2014 provides access to an administrator, through the administration module 2010, for defining several types, properties, and interrelationships of the real world entities and the action capabilities of the real world entities, using these rules and algorithm. While defining several types, properties, and interrelationships of the real world entities and the action capabilities of the real world entities, the administrator can visualize the changes in the console and visualization module 2008. Further, after this, the analytics and metrics module 2014 can facilitate in harvesting the knowledge represented in the knowledge representation module 2000 for knowledge retrieval. Knowledge harvesting may be understood as capturing and expressing knowledge in a form that can be easily accessed and used by several users who seek the information.

Figure 21:
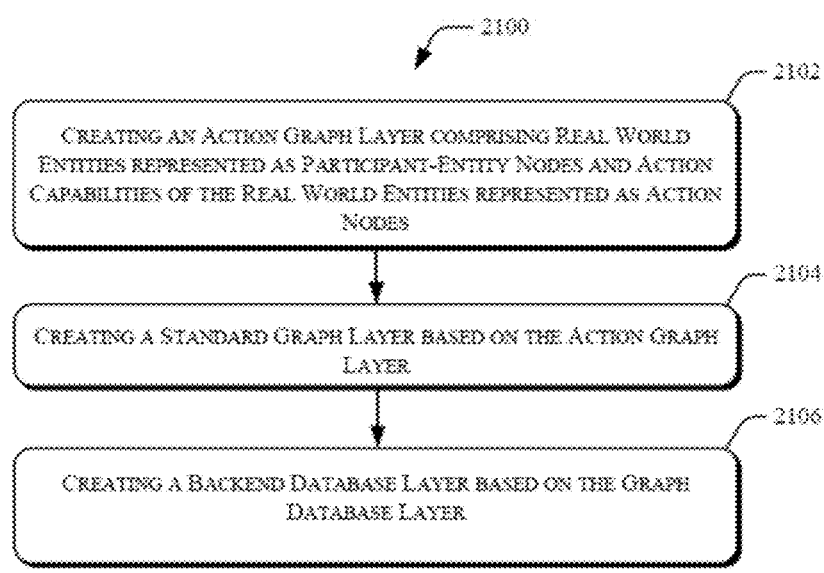
FIG. 21 illustrates an example method for creating knowledge representation in a multi-layered database, in accordance with an implementation of the present subject matter.

FIG. 21 illustrates an example method 2100 for creating knowledge representation in a multi-layered database 104, in accordance with an implementation of the present subject matter. In an example, the method 2100 may be implemented by a module of a computing system, such as the modules 208 of the system 102.

The order in which the method is described is not intended to be construed as a limitation, and any number of the described method blocks can be combined in any order to implement the method, or any alternative methods. Additionally, individual blocks may be deleted from the method without departing from the subject matter described herein. Furthermore, the methods can be implemented in any suitable hardware platform(s).

The method may be described in the general context of computer executable instructions. Generally, computer executable instructions can include routines, programs, objects, components, data structures, procedures, modules, functions, etc., that perform particular functions or implement particular abstract datatypes. The method may also be practiced in a distributed computing environment where functions are performed by remote processing devices that are linked through a communications network. In a distributed computing environment, computer executable instructions may be located in both local and remote computer storage media, including memory storage devices.

In another implementation, the method may be stored and executed as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer.

By way of example, and not limitation, such computer-readable media can comprise RAM, ROM, EEPROM, CD-ROM, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also be included in the scope of computer-readable media.

Referring to FIG. 21, at block 2102, an action graph layer may be created. The action graph layer can include real world entities represented as participant-entity nodes, and action capabilities of the real world entities represented as action nodes. Each of the participant-entity nodes is associated with respective attributes. The attributes include properties of the real world entities, relationships among the real world entities and their associated relationship properties. Similarly, each of the action nodes is associated with respective attributes, wherein the attributes include properties of the capabilities of the real world entities, relationships among the capabilities and their associated relationship properties. The creation of action graph layer can be done, for example, by the operation module 120, as discussed above.

At block 2104, a standard graph layer may be created. The creation of the graph layer is based on the action graph layer. The graph layer includes nodes and edges relating these nodes. The creation of the standard graph layer is done by decomposing the participant-entity nodes and the action nodes of the action graph layer into nodes, properties associated with the nodes, edges connecting the nodes, and properties of the edges. The properties associated with the nodes indicate the properties of the participant-entity nodes or the action nodes. The edges indicate the relationships among the participant-entity nodes and the action nodes of the action graph layer. The properties associated with the edges indicate the properties of the participant-entity relationships, action relationships and the action-participant relationships. The creation of the standard graph layer can be done, for example, by the operation module 120, as discussed above.

At block 2106, a backend database layer 130 is created. The creation of the database layer is based on the standard graph layer. The backend database layer includes data and metadata corresponding to the nodes, the properties associated with the nodes, the edges, and properties of the edges of the standard graph layer. In one example, the backend database layer can provide for scalable data storage through one or more of HDFS, HBASE, RDBMS, or other types of databases and file systems. The creation of the backend database layer can be done, for example, by the operation module 120, as discussed above.

Figure 22:
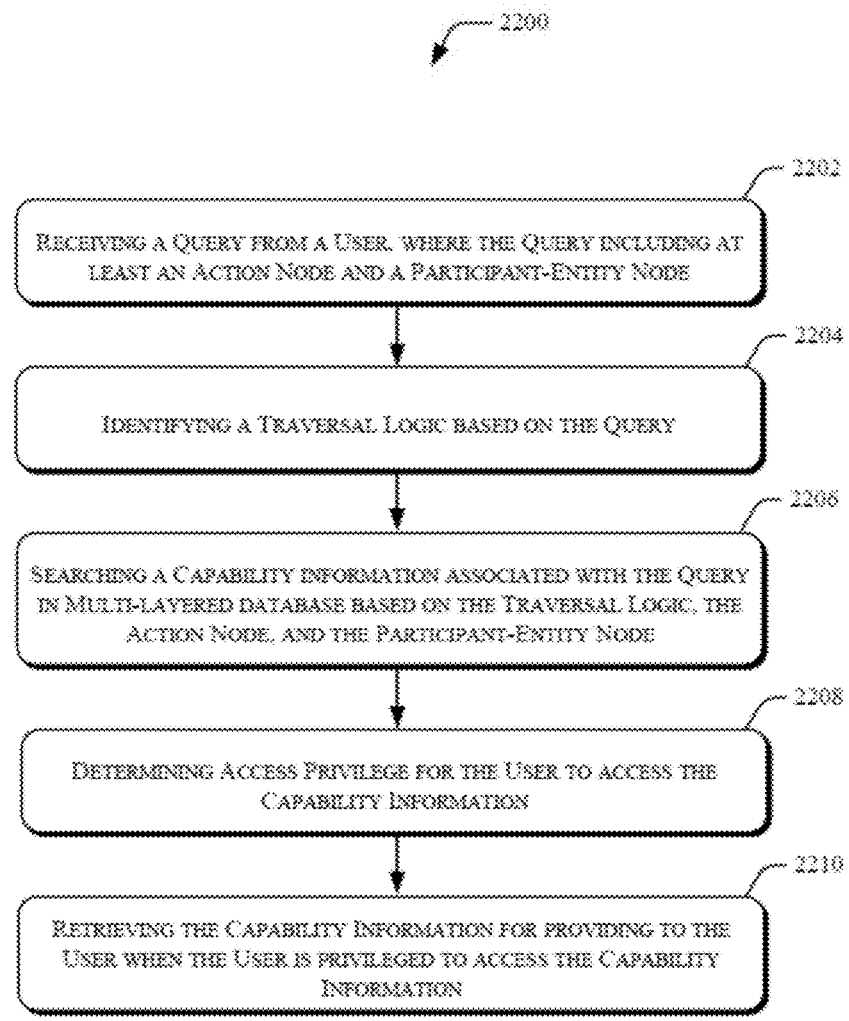
FIG. 22 illustrates an example method for retrieval of information from the multi-layered database, in accordance with an implementation of the present subject matter.

FIG. 22 illustrates an example method 2200 for retrieval of capability information from the multi-layered database 104, in accordance with an implementation of the present subject matter. In an example, the method 2200 may be implemented by a module of a computing system, such as the modules 208 of the system 102.

Referring now to FIG. 22, at block 2202, a query is received from a user. The query can include an action node and a participant-entity node corresponding to real world entities for which the capability information has to be retrieved. In one example, the query can include a Lucene syntax based query. The query can be received, for example, by the API module 110, as discussed above.

At block 2204, based on the query, a traversal logic is identified by which the capability information has to be retrieved. The traversal logic can be identified, for example, by the traversal module 112, as discussed above.

At block 2206, based on the traversal logic, the action node, the participant-entity node, the capability information associated with the query is searched in the multi-layered database. The capability information can be searched, for example, by the seek module 114, as discussed above.

At block 2208, access privilege for the user is determined. The access privilege indicates whether user is authorized to access the capability information or not. The access privilege for the user can be determined, for example, by the authorization module 116.

At block 2210, the capability information corresponding to the action node and the participant-entity node of the query is retrieved for providing to the user. The capability information is retrieved only when the user is privileged to access the capability information. The capability information corresponding to query can be retrieved, for example, by the retrieval module 118, as discussed above.

Figure 23:
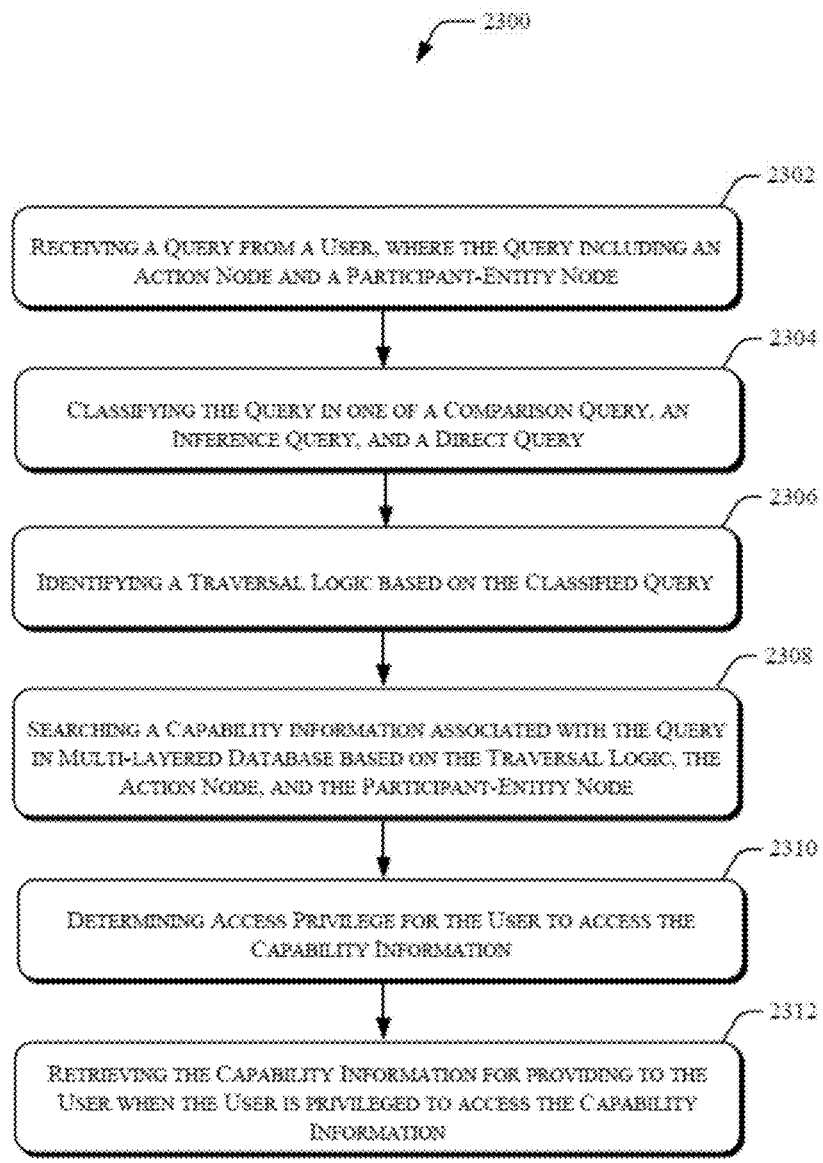
FIG. 23 illustrates an example method for retrieval of information from the multi-layered database, in accordance with another alternative implementation of the present subject matter.

FIG. 23 illustrates an example method 2300 for retrieval of capability information from the multi-layered database 104, in accordance with another alternative implementation of the present subject matter. In an example, the method 2200 may be implemented by a module of a computing system, such as the modules 208 of the system 102.

Referring now to FIG. 23, at block 2302, a query is received from a user. The query can include at least an action node and a participant-entity node corresponding to real world entities for which the capability information has to be retrieved. In one example, the query can include a Lucene syntax based query. The query can be received, for example, by the API module 110, as discussed above.

At block 2304, the query is classified based on user requirements. For example, the query can be classified as at least one of a comparison query, an inference query, and a direct query. The query can be classified, for example, by the API module 110, as discussed above.

At block 2306, based on the classified query, a traversal logic is identified by which the capability information has to be retrieved. The traversal logic can be identified, for example, by the traversal module 112, as discussed above.

At block 2308, based on the traversal logic, the action node, the participant-entity node, the capability information associated with the query is searched in the multi-layered database. The capability information can be searched, for example, by the seek module 114, as discussed above.

At block 2310, access privilege for the user is determined. The access privilege indicates whether user is authorized to access the capability information or not. The access privilege for the user can be determined, for example, by the authorization module 116.

At block 2312, the capability information corresponding to the action node and the participant-entity node of the query is retrieved for providing to the user. The capability information is retrieved only when the user is privileged to access the capability information. The capability information corresponding to query can be retrieved, for example, by the retrieval module 118, as discussed above.

Although implementations for methods and systems for knowledge representation in a multi-layered database are described, it is to be understood that the present subject matter is not necessarily limited to the specific features or methods described. Rather, the specific features and methods are disclosed as implementations for knowledge representation in a multi-layered database.

What is claimed is:

1. A system for storing data using a knowledge representation scheme in a multi-layered database, the system comprising:
 a processor;
 an operation module coupled to the processor to:
 receive attributes including properties and relationships of a real world entity and at least one of an action capability of the real world entity for storage in the multi-layered database, from a user;
 store a participant-entity node corresponding to the real world entity in an action graph layer of the multi-layered database, wherein the participant-entity node is associated with participant properties that characterize the participant-entity node based on the attributes of the real world entity, wherein the participant-entity node is related to at least one other participant-entity node to obtain participant relationship properties, and wherein the participant-entity node is at least one of a subject node, an object node, and a primitive literal string node;
 store an action node corresponding to the action capability of the real world entity in the action graph layer of the multi-layered database wherein the action node is associated with action properties, wherein the action node is related to at least one other action node to obtain an action relationship, wherein the action node is further related to the participant-entity node to obtain an action participant relationship, wherein the action-participant relationships comprise at least one of a modal relationship and a general relationship connecting at least an action node to one or more participant-entity nodes to facilitate many-to-many participant-entity mapping,
 wherein the modal relationship relates the action node to the subject node, and wherein the general relationship relates the action node to at least an object node or a primitive literal string node;
 a decomposer module coupled to the processor to:
 decompose the participant-entity node, the participant-properties, the action node, and the action-properties of the action graph layer into nodes and properties associated with the corresponding nodes;
 decompose the participant-relationship, the action-relationship,
 the action-participant relationship, and corresponding relationship properties of the relationships in the action graph layer, into edges connecting the nodes and edge properties associated with the corresponding edges respectively;
 store the nodes, the edges, the node properties, and the edge properties in a standard graph layer of the multi-layered database;
 decompose further the nodes, the edges, the node properties, and the edge properties of the standard graph layer into data and metadata associated with the data; and
 store the data and the metadata in a backend database layer of the multi-layered database.

2. The system as claimed in claim 1, wherein the action relationship comprise at least one of an inheritance relationship, step relationship, constituent (synonym) relationship, and a like relationship, wherein the inheritance relationship facilitates a child action node to inherit properties and relationships of its parent action node, wherein the step relationship facilitates an action node to be related to another action node comprising a particular action step, wherein the constituent relationship facilitates an action node to be related to one or more action nodes representing synonyms of action associated with that action node, and wherein the like relationship facilitates an action node to be related to at least another action node with similar properties.

3. The system as claimed in claim 1, wherein the action properties further comprises parameters comprising at least a pre-condition parameter, a step parameter, and a quantity parameter, wherein the precondition parameter captures pre-conditional actions necessary for an action to be performed, a step parameter stores the level of granularity up to which the user would like to retrieve information in case of read operations, and the quantity parameter quantizes the action node in terms of its participant-entity quantities.

4. The system as claimed in claim 1, wherein the system is further coupled to an indexed seek module to index the nodes and edges of the standard graph layer wherein the nodes being decomposed from the participant-entity nodes, and the action nodes of the action graph layer, and wherein the edges being decomposed from the action relationship, participant relationship, and action-participant relationship of the action graph layer, based on at least one indexing technique, wherein the at least one indexing technique is pluggable to the backend database layer.

5. A system for retrieving capability information by a user using a knowledge representation scheme in a multi-layered database, the system comprising:
a processor;
an application programming interface (API) module coupled to the processor to receive a query from the user to retrieve the capability information from the multi-layered database, wherein the query comprises at least a participant-entity node corresponding to a real world entity and at least an action node corresponding to an action capability of the real world entity; and
a traversal module coupled to the processor to identify a traversing logic, based on the query, one or more participant-entity nodes and one or more action nodes in an action graph layer of the multi-layered database, wherein the one or more participant-entity nodes is at least one of a subject node, an object node, and a primitive literal string node,
wherein the traversing logic corresponds to the one or more participant-entity nodes associated with participant properties and the action nodes associated with action properties, and wherein athe participant entity node is related to the at least one other participant-entity node to obtain a participant relationship, the participant properties characterize a participant-entity node, and wherein the action node is related to the at least one other action node to obtain an action relationship, an action relationship properties that characterize the action relationship, action-participant relationship that relates the action node to the at least one participant-entity node,
wherein the action-participant relationships comprise at least one of a modal relationship and a general relationship connecting at least an action node to one or more participant-entity nodes to facilitate many-to-many participant-entity mapping, wherein the modal relationship relates the action node to the subject node, and wherein the general relationship relates the action node to at least an object node or a primitive literal string node, and action-participant relationship properties that characterize the action-participant relationship, and wherein the action properties characterize the action node, and wherein the action properties further comprising at least one of a pre-condition parameter, a step parameter and a quantity parameter;
a seek module coupled to the processor to perform a search of capability information associated with the query in the action graph layer, based on at least the action node, the participant-entity node and the traversing logic;
an authorization module coupled to the processor to determine access privileges for the user to access the capability information, wherein the access privileges are based on user role; and
a retrieval module coupled to the processor to retrieve the capability information for providing to the user when the user is privileged to access the capability information.

6. The system as claimed in claim 5, wherein the retrieval module is further configured to compose the capability information, wherein the composing the capability information comprises:
identifying, in the action graph layer, the traversing logic to search the participant-entity node and the action node comprised in the query;
identifying, in the standard graph layer, one or more nodes corresponding to the participant-entity node and the action node, edges connecting the one or more nodes, and the properties associated with the one or more nodes and the edges;
obtaining data and metadata corresponding to the one or more nodes and the edges from the backend database layer; and
compiling the one or more nodes based on the data and the metadata, and the one or more participant-entity nodes and the one or more action nodes based on the one or more nodes to form the capability information.

7. The system as claimed in claim 5, wherein the seek module searches the capability information by performing a search based on the query in an index of the standard graph layer, and wherein the index is a segmented index implementing a plurality of indexing techniques.

8. The system as claimed in claim 5, wherein the seek module retrieves the capability information by performing a non-indexed search in the standard graph layer.

9. A computer implemented method for storing data using a knowledge representation scheme in a multi-layered database, the method comprising:
receiving, by a processor, attributes of a real world entity and at least one of an action capability of the real world entity for storage in the multi-layered database, wherein the attributes characterize properties and relationships of the real world entity and the properties and the relationships of the action capability of the real world entity;
storing, by the processor, a participant-entity node corresponding to the real world entity in an action graph layer of the multi-layered database, wherein the participant-entity node is associated with participant properties that characterize the participant-entity node, wherein the participant-entity node is related to at least one other participant-entity node to obtain participant relationship properties, and wherein the participant-entity node is at least one of a subject node, an object node, and a primitive literal string node;
storing, by the processor, an action node corresponding to the action capability of the real world entity in the action graph layer of the multi-layered database, wherein the action node is associated with action properties, wherein the action node is related to at least one other action node to obtain an action relationship, wherein the action node is further related to the participant-entity node to obtain an action participant relationship, wherein the action-participant relationships comprise at least one of a modal relationship and a general relationship connecting at least an action node to one or more participant-entity nodes to facilitate many-to-many participant-entity mapping, wherein the modal relationship relates the action node to the subject node, and wherein the general relationship relates the action node to at least an object node or a primitive literal string node;

decomposing, by the processor, the participant-entity node, the participant-properties, the action node, and the action-properties of the action graph layer into nodes and properties associated with the corresponding nodes;

decomposing, by the processor, the participant-relationship, the action-relationship, and the action-participant relationship and the corresponding relationship properties of the relationships in the action graph layer, into edges connecting the nodes and edge properties associated with the corresponding edges respectively;

storing, by the processor, the nodes, the edges, the node properties, and the edge properties in a standard graph layer of the multi-layered database;

decomposing further, by the processor, the nodes, the edges, the node properties, and the edge properties into data and metadata associated with the data, and storing, by the processor, the data and the metadata in a backend database layer of the multi-layered database.

10. The method as claimed in claim 9, wherein the action relationship comprise at least one of an inheritance relationship, step relationship, constituent (synonym) relationship, and a like relationship, wherein the inheritance relationship facilitates a child action node to inherit properties and relationships of its parent action node, wherein the step relationship facilitates an action node to be related to another action node comprising a particular action step, wherein the constituent relationship facilitates an action node to be related to the one or more action nodes representing synonyms of action associated with that action node, and wherein the like relationship facilitates an action node to be related to at least another action node with similar properties.

11. The method as claimed in claim 9, comprising updating, by the processor, the action properties comprising parameters such as at least a pre-condition parameter, a step parameter and a quantity parameter, wherein a precondition parameter captures pre-conditional actions necessary for an action to be performed, a step parameter stores the level of granularity up to which the user would like to retrieve information in case of read operations, and a quantity parameter quantizes the action node in terms of its participant-entity quantities.

12. The method as claimed in claim 9, comprising indexing the nodes and edges of the standard graph layer wherein the nodes being decomposed from the participant-entity nodes, and the action nodes of the action graph layer, and wherein the edges being decomposed from the action relationship, the participant relationship and the action-participant relationship of the action graph layer, based on at least one indexing technique, wherein the at least one indexing technique is pluggable to the backend database layer.

13. A computer implemented method for retrieving capability information by a user using a knowledge representation scheme in a multi-layered database, the method comprising:
receiving, by a processor, a query from the user to retrieve the capability information from the multi-layered database, wherein the query comprises at least a participant-entity node corresponding to a real world entity and at least an action node corresponding to an action capability of the real world entity;
based on the query, classifying, by the processor, the query in one of a comparison query, an inference query, and a direct query;
based on the classified query, identifying, by the processor, a traversing logic to traverse an action graph layer of the multi-layered database,
wherein the traversing logic corresponds to the one or more participant-entity nodes associated with participant properties and the action nodes associated with action properties, and wherein the participant entity node is related to the at least one other participant-entity node to obtain a participant relationship, the participant properties characterize a participant-entity node, and wherein the action node is related to the at least one other action node to obtain an action relationship, an action relationship properties that characterize the action relationship, action-participant relationship that relates the action node to the at least one participant-entity node,
wherein the action-participant relationships comprise at least one of a modal relationship and a general relationship connecting at least an action node to one or more participant-entity nodes to facilitate many-to-many participant-entity mapping, wherein the modal relationship relates the action node to the subject node, and wherein the general relationship relates the action node to at least an object node or a primitive literal string node, and action-participant relationship properties that characterize the action-participant relationship, and wherein the action properties characterize the action node, and wherein the action properties further comprising at least one of a pre-condition parameter, a step parameter and a quantity parameter;
searching, by the processor, the capability information associated with the classified query in the action graph layer of the multi-layered database, based on the action node, the participant-entity node and the traversing logic;
determining, by the processor, access privileges for the user to access the capability information, wherein the access privileges are based on user role; and
retrieving, by the processor, the capability information for providing to the user when the user is privileged to access the capability information.

14. The method as claimed in claim 13 comprising composing, by the processor, the capability information, by:
identifying, by the processor, in the action graph layer, the traversing logic to search the participant-entity node and the action node comprised in the query;
identifying, by the processor, in the standard graph layer, one or more nodes corresponding to the participant-entity node and the action node, edges connecting the one or more nodes, and properties associated with the one or more nodes;
obtaining, by the processor, the data and metadata corresponding to the one or more nodes and the edges from the backend database layer; and compiling, by the processor, the one or more nodes based on the data and the metadata, and the one or more participant-entity nodes and the one or more action nodes based on the one or more nodes to form the capability information.

15. The method as claimed in claim 13, wherein searching the capability information includes performing, by the processor, a search based on the query in an index of the standard graph layer, wherein the index is a segmented index implementing a plurality of indexing techniques.

16. The method as claimed in claim 13, wherein searching the capability information includes performing, by the processor, a non-indexed search in the standard graph layer.

17. A non-transitory computer readable medium comprising instructions executable by a processor to perform a method for storing data using a knowledge representation scheme in a multi-layered database, the method comprising:
receiving, by a processor, attributes of a real world entity and at least an action capability of the real world entity for storage in the multi-layered database, wherein the attributes include properties and the relationships of the real world entity and the properties and the relationships of the action capability of the real world entity;
storing, by the processor, a participant-entity node corresponding to the real world entity in an action graph layer of the multi-layered database, wherein the participant-entity node is associated with participant properties that characterize the participant-entity node; based on the attributes of the real world entity, wherein the participant-entity node is related to at least one other participant-entity node to obtain participant relationship properties, and wherein the participant-entity node is at least one of a subject node, an object node, and a primitive literal string node;
storing, by the processor, an action node corresponding to the action capability of the real world entity in the action graph layer of the multi-layered database, wherein, based on the attributes of the action capability, the action node is associated with action properties an action node corresponding to the action capability of the real world entity in the action graph layer of the multi-layered database wherein the action node is associated with action properties, wherein the action node is related to at least one other action node to obtain an action relationship, wherein the action node is further related to the participant-entity node to obtain an action participant relationship, wherein the action-participant relationships comprise at least one of a modal relationship and a general relationship connecting at least an action node to one or more participant-entity nodes to facilitate many-to-many participant-entity mapping, wherein the modal relationship relates the action node to the subject node, and wherein the general relationship relates the action node to at least an object node or a primitive literal string node;
decomposing, by the processor, the participant-entity node, the participant-properties, the action node, and the action-properties of the action graph layer into nodes and properties associated with the corresponding nodes;
decomposing, by the processor, the participant-relationship, the action-relationship, and the action-participant relationship and the corresponding relationship properties of the relationships in the action graph layer, into edges connecting the nodes and edge properties associated with the corresponding edges respectively;
storing, by the processor, the nodes, the edges, the node properties, and the edge properties in a standard graph layer of the multi-layered database;
decomposing further, by the processor, the nodes, the edges, the node properties, and the edge properties into the data and metadata associated with the data; and
storing, by the processor, the data and the metadata in a backend database layer of the multi-layered database.

18. A non-transitory computer readable medium comprising instructions executable by the processor to perform a method for retrieving capability information using a knowledge representation scheme in a multi-layered database, the method comprising
receiving, by a processor, a query from a user to retrieve the capability information from the multi-layered database, wherein the query comprises at least a participant-entity node corresponding to a real world entity and at least an action node corresponding to an action capability of the real world entity;
based on the query, classifying, by the processor, the query in one of a comparison query, an inference query, and a direct query;
based on the classified query, identifying, by the processor, a traversing logic to traverse an action graph layer of the multi-layered database, wherein the traversing logic corresponds to the one or more participant-entity nodes associated with participant properties and the action nodes associated with action properties, and wherein the participant entity node is related to the at least one other participant-entity node to obtain a participant relationship, the participant properties characterize a participant-entity node, and wherein the action node is related to the at least one other action node to obtain an action relationship, an action relationship properties that characterize the action relationship, action-participant relationship that relates the action node to the at least one participant-entity node, wherein the action-participant relationships comprise at least one of a modal relationship and a general relationship connecting at least an action node to one or more participant-entity nodes to facilitate many-to-many participant-entity mapping, wherein the modal relationship relates the action node to the subject node, and wherein the general relationship relates the action node to at least an object node or a primitive literal string node, and action-participant relationship properties that characterize the action-participant relationship, and wherein the action properties characterize the action node, and wherein the action properties further comprising at least one of a pre-condition parameter, a step parameter and a quantity parameter;
searching, by the processor, the capability information associated with the classified query in the action graph layer of the multi-layered database, based on the action node, the participant-entity node, and the traversing logic;
determining, by the processor, access privileges for the user to access the capability information, wherein the access privileges are based on user role; and
retrieving, by the processor, the capability information for providing to the user when the user is privileged to access the capability information.

* * * * *